May 17, 1927.  1,628,997
J. B. RETALLACK
TESTING DEVICE FOR TESTING REGISTER SENDERS
Filed July 6, 1925  25 Sheets-Sheet 5

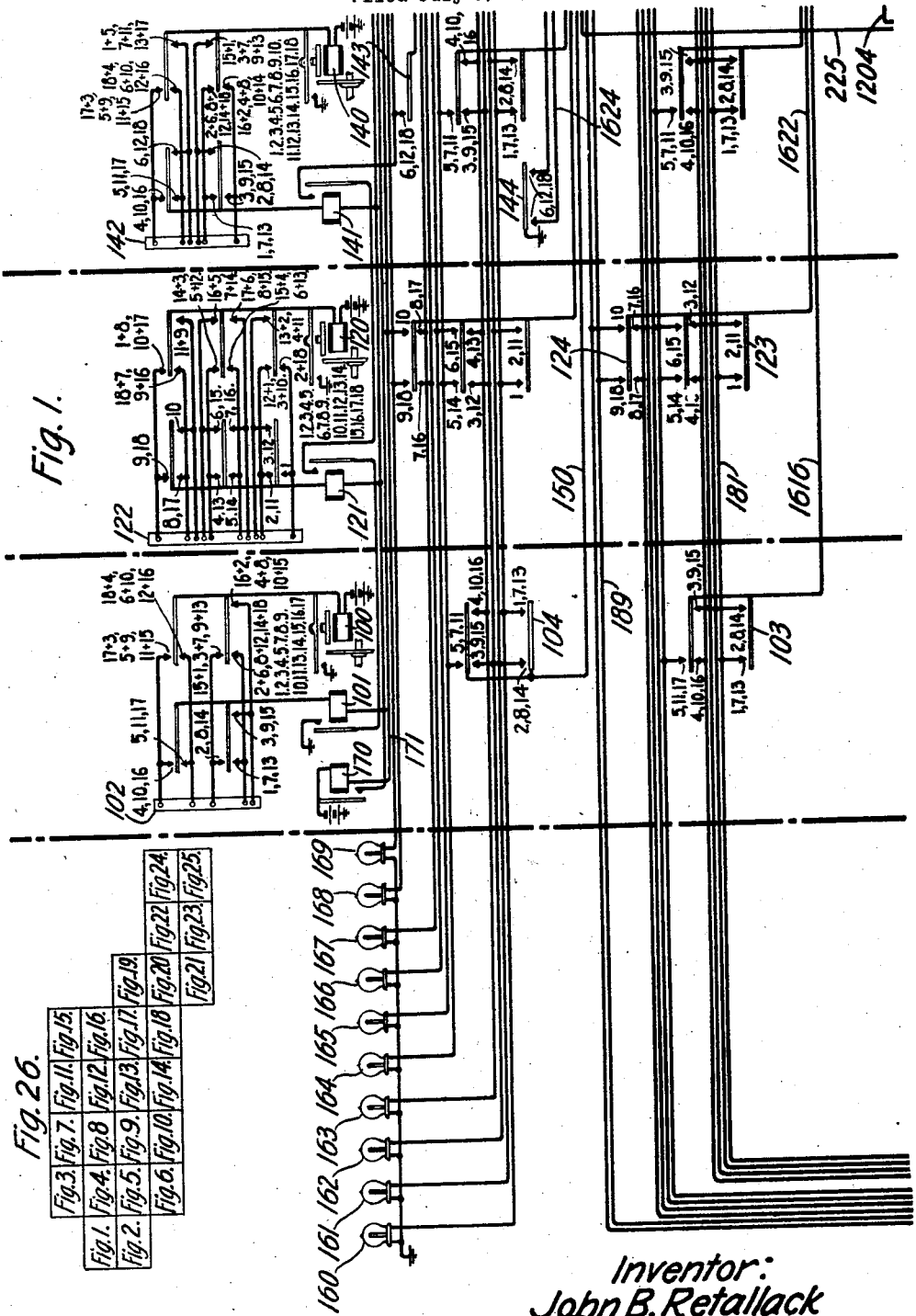

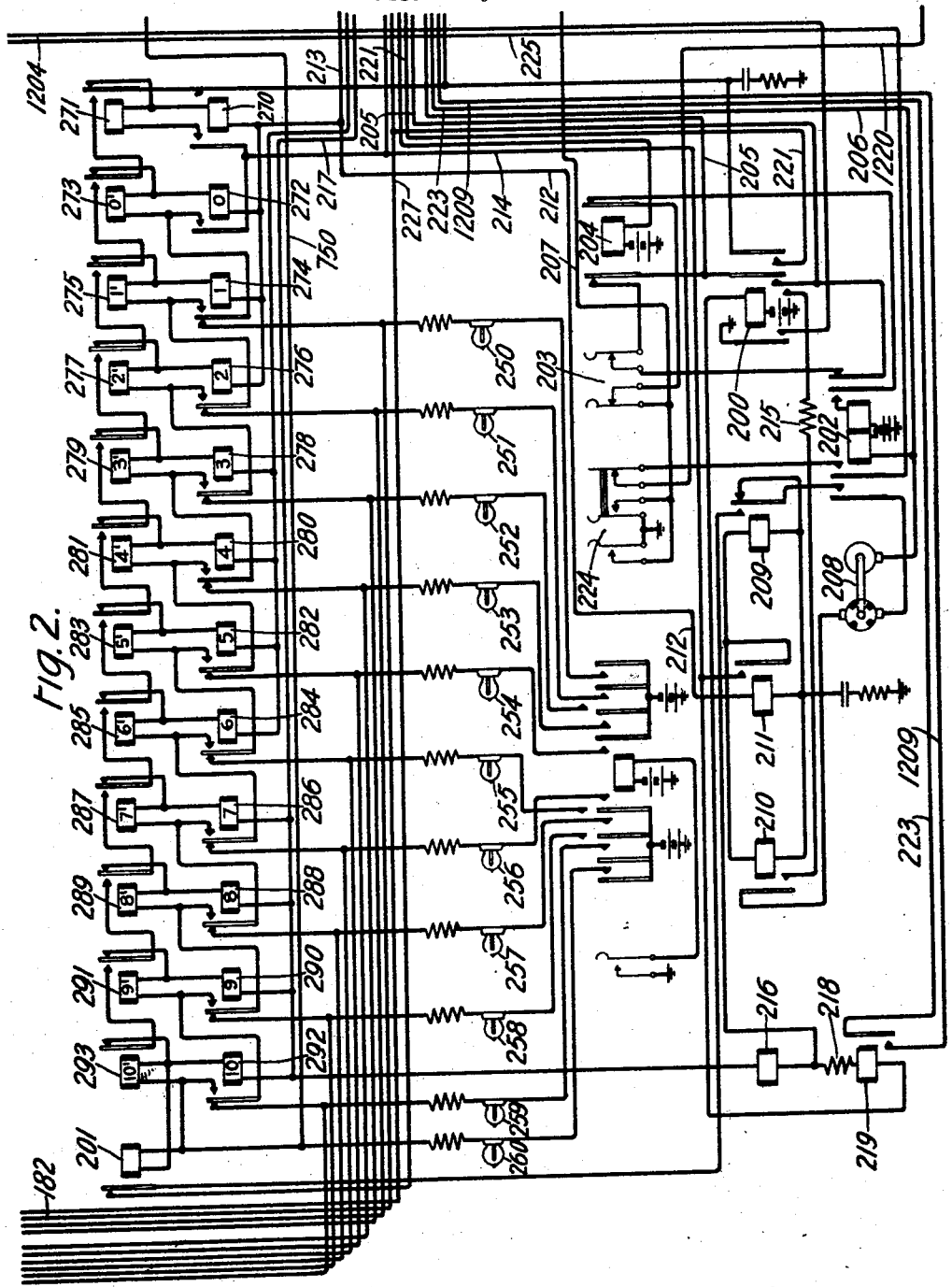

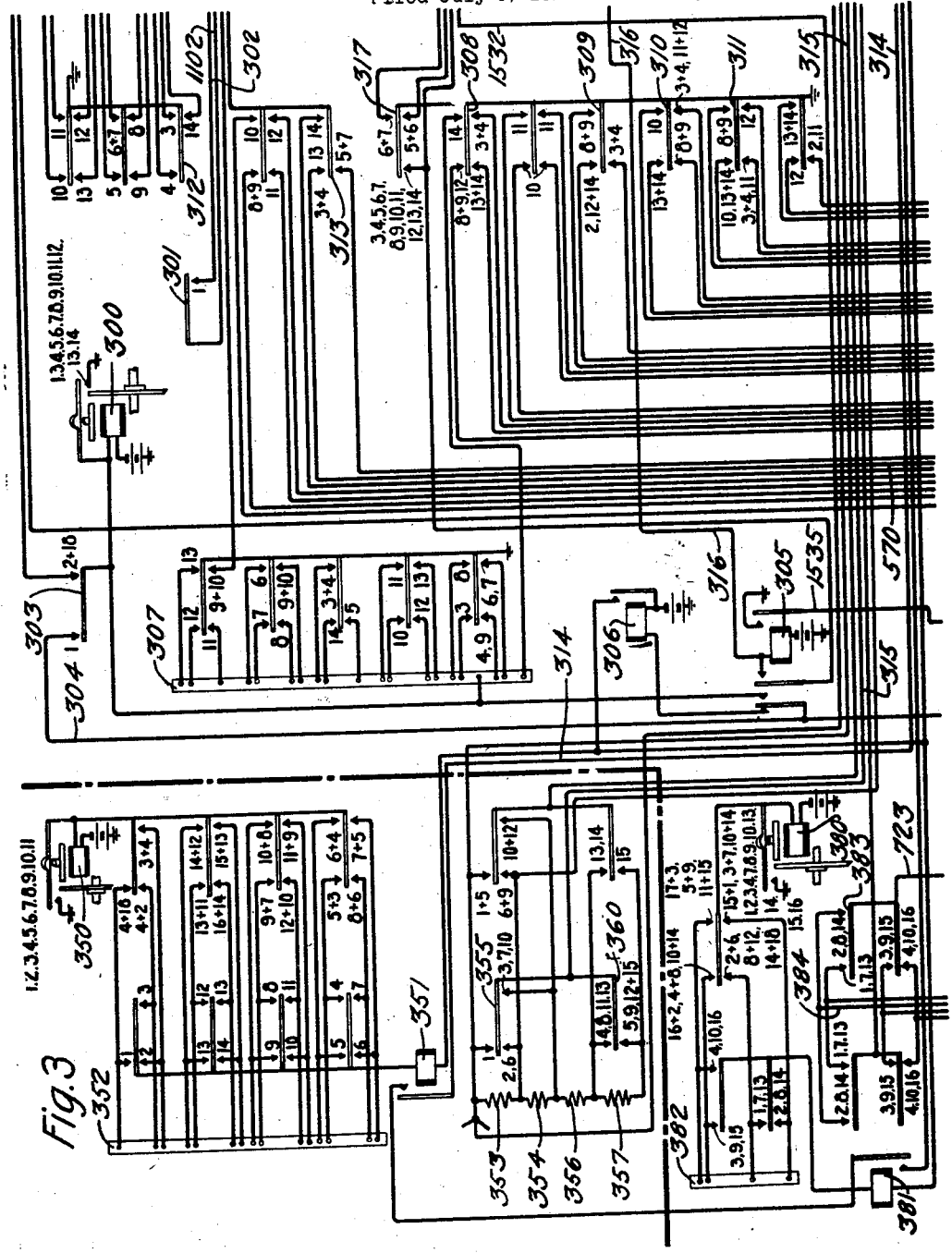

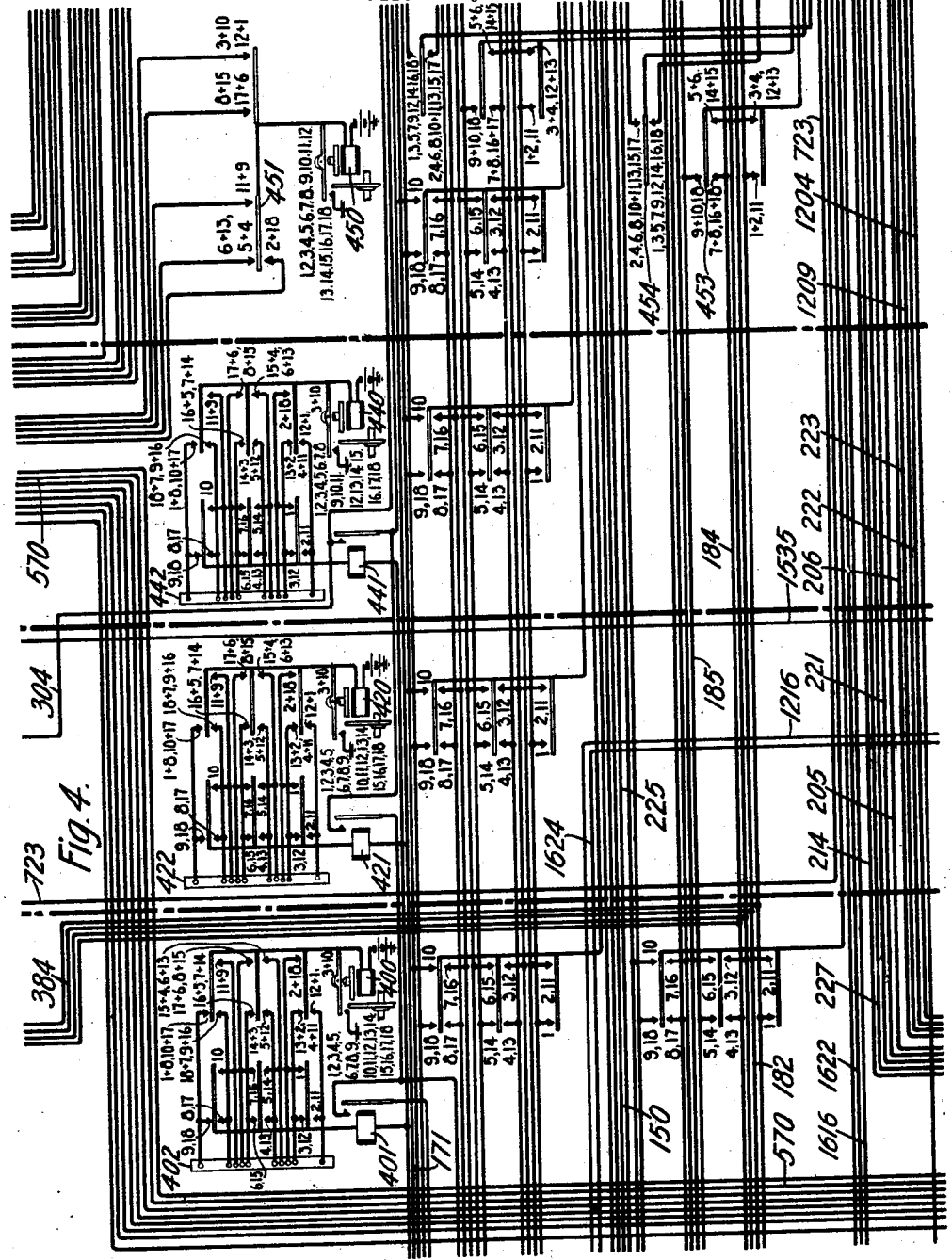

Inventor:
John B. Retallack
by E. W. Adams, Atty.

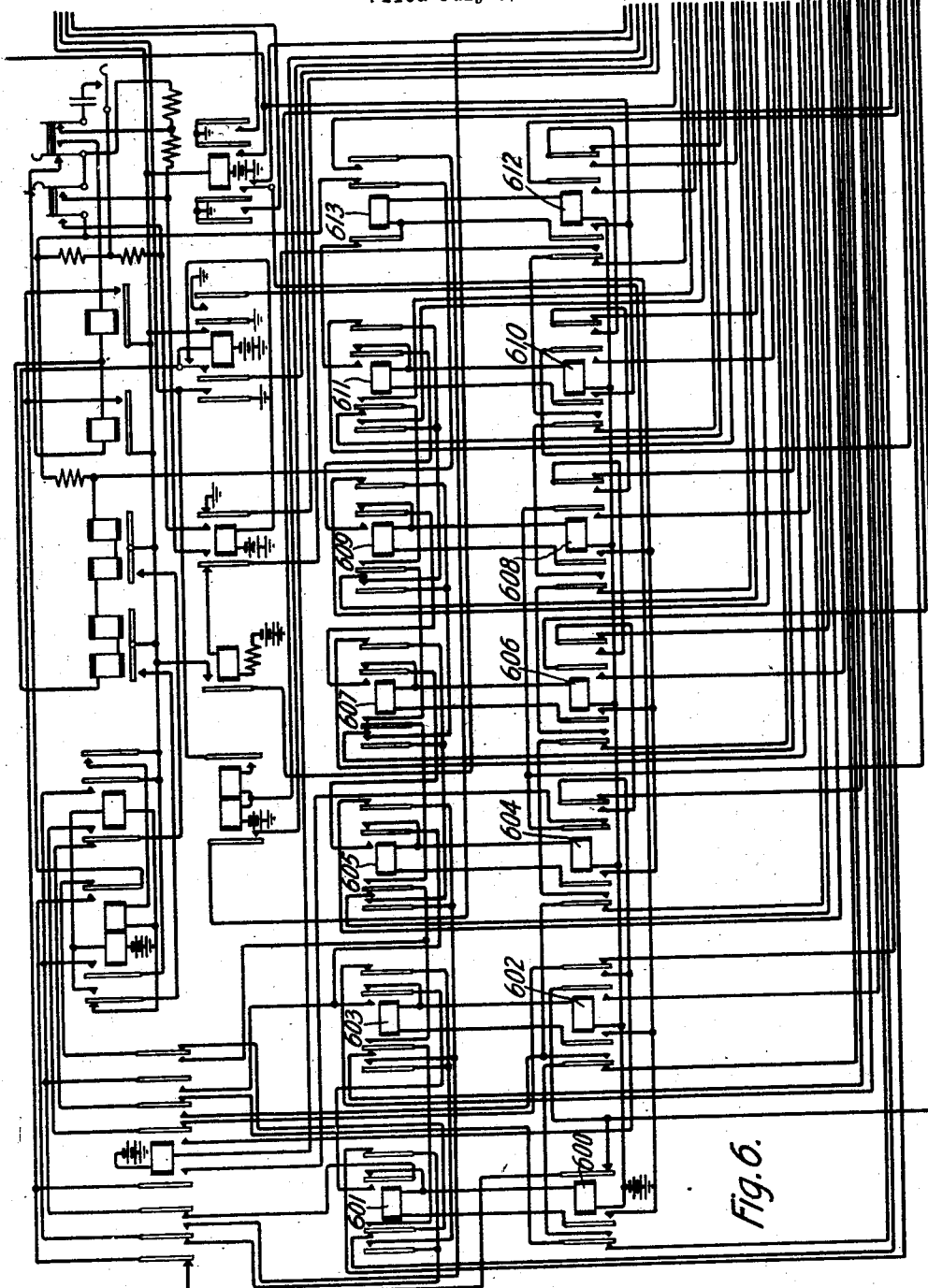

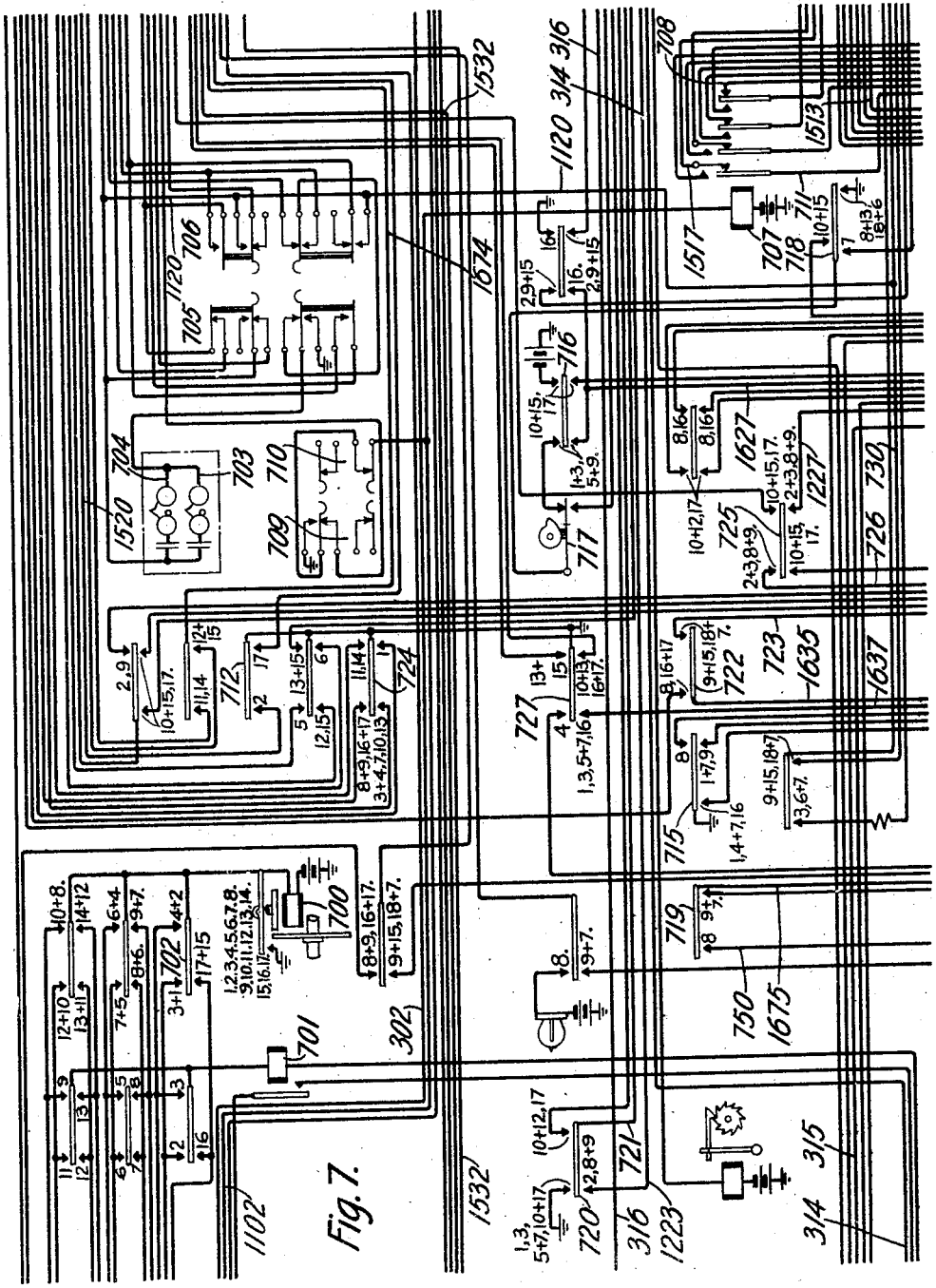

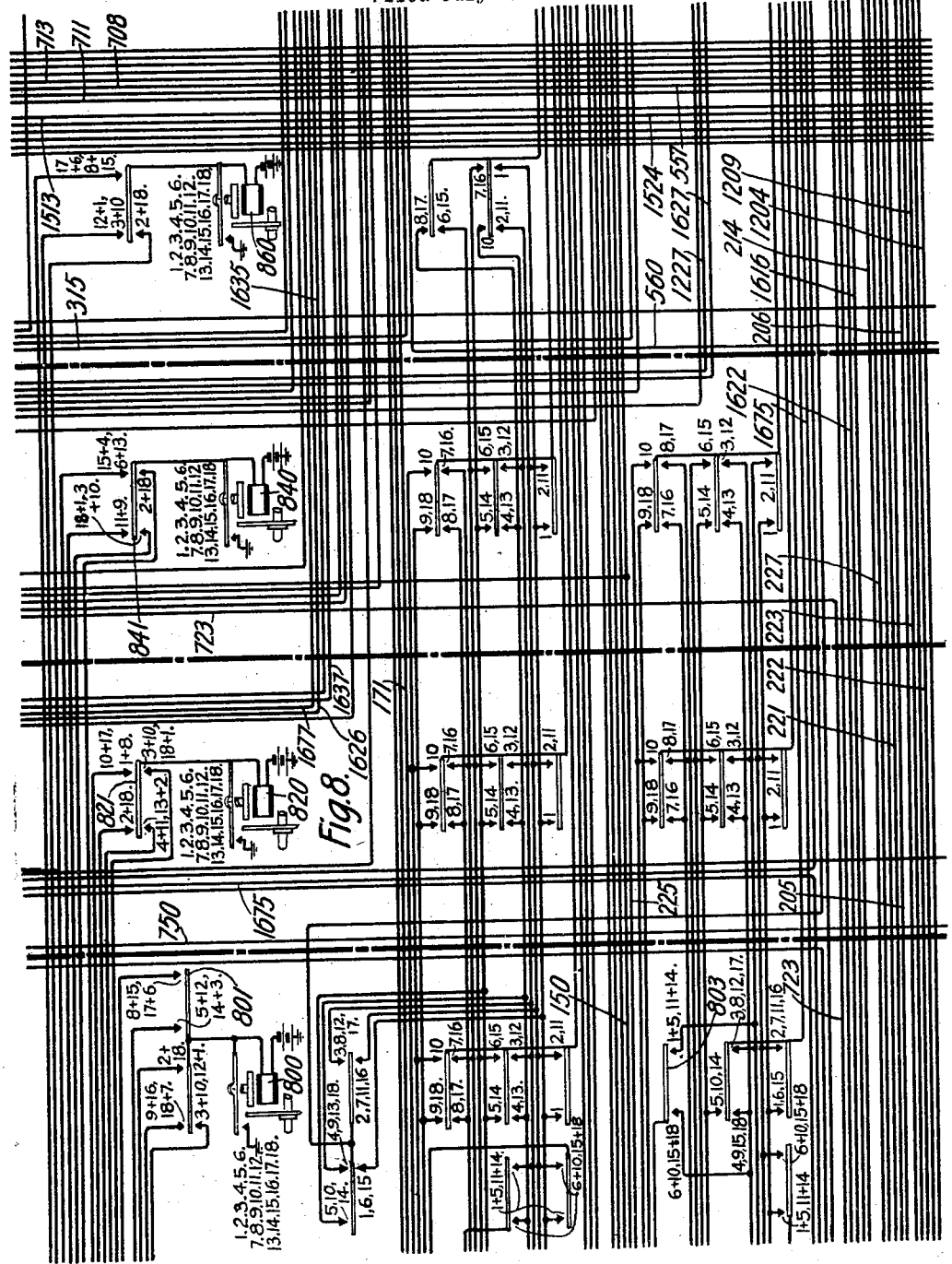

May 17, 1927.

J. B. RETALLACK 1,628,997

TESTING DEVICE FOR TESTING REGISTER SENDERS

Filed July 6. 1925     25 Sheets-Sheet 9

Fig. 9.

Inventor:
John B. Retallack
by E. W. Adams, Atty.

May 17, 1927. J. B. RETALLACK 1,628,997
TESTING DEVICE FOR TESTING REGISTER SENDERS
Filed July 6, 1925    25 Sheets-Sheet 10

Inventor:
John B. Retallack
by E. W. Adams, Atty.

Inventor:
John B. Retallack

May 17, 1927.  1,628,997
J. B. RETALLACK
TESTING DEVICE FOR TESTING REGISTER SENDERS
Filed July 6, 1925    25 Sheets-Sheet 19

Inventor:
John B. Retallack
by E. W. Adams, Atty.

May 17, 1927. 1,628,997
J. B. RETALLACK
TESTING DEVICE FOR TESTING REGISTER SENDERS
Filed July 6, 1925 25 Sheets-Sheet 21

Inventor:
John B. Retallack
by E. W. Adams, Att'y.

May 17, 1927.

J. B. RETALLACK 1,628,997

TESTING DEVICE FOR TESTING REGISTER SENDERS

Filed July 6, 1925    25 Sheets-Sheet 23

Inventor:
John B. Retallack
by E. W. Adams Atty.

Inventor:
John B. Retallack
by E.W.Adams, Atty.

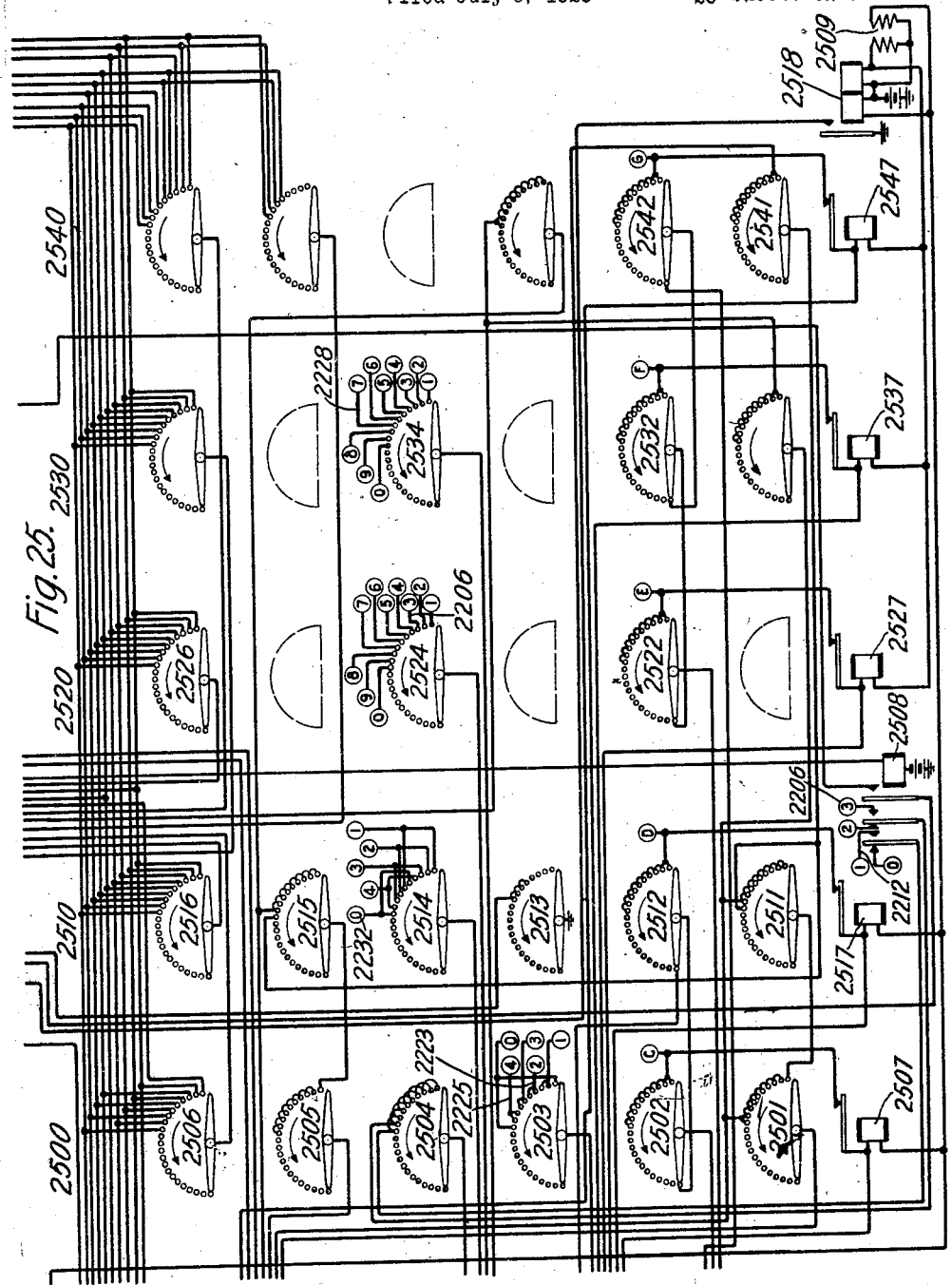

Patented May 17, 1927.

1,628,997

UNITED STATES PATENT OFFICE.

JOHN B. RETALLACK, OF MAPLEWOOD, NEW JERSEY, ASSIGNOR TO WESTERN ELECTRIC COMPANY, INCORPORATED, OF NEW YORK, N. Y., A CORPORATION OF NEW YORK.

TESTING DEVICE FOR TESTING REGISTER SENDERS.

Application filed July 6, 1925. Serial No. 41,627.

This invention relates to telephone exchange systems and particularly to testing systems for testing register senders in panel type machine switching systems.

Certain register senders are provided with means whereby delayed dialing or incomplete dialing will prevent the extension of a call and in case dialing is delayed unduly will extend the connection to an operator. A sender of this type is described in the Patent No. 1,589,402 granted to Ottmar H. Kopp, June 22, 1926.

The object of the present invention is to provide testing arrangements for testing register senders of the above type.

A feature of the invention is the provision of means operative in certain tests for delaying the simulation of dialing of subsequent digits until the selections controlled by the digits already registered have been checked and to employ the failure of the sender to prevent the advance of the test.

This and other features of the invention will be more apparent from a consideration of the following description in connection with the drawings and appended claims.

In the drawings Figs. 1 to 19 illustrate the testing device of the present invention, Figs. 20 to 25 illustrate the sender to be tested and Fig. 26 shows diagrammatically the arrangement of the figures for the disclosure of the invention.

More in detail, Figs. 1, 4, 5, 8 and 9 show a plurality of registers for controlling the setting of the sender registers and the checking of selections.

Fig. 2 shows a set of counting relays which are employed in the checking of selections.

Fig. 3 shows a compensating resistance register, a talking selection register, and one of two switches controlling the setting of the other registers.

In the lower left corner of Fig. 5 is shown a pair of sequence switches for simulating dial pulses.

Fig. 6 shows a group of control relays and transfer relays for receiving relay call indicator pulses.

Fig. 7 shows a class sequence switch and various keys for controlling the type of line condition to be used in connection with the test of the sender.

Figure 10:
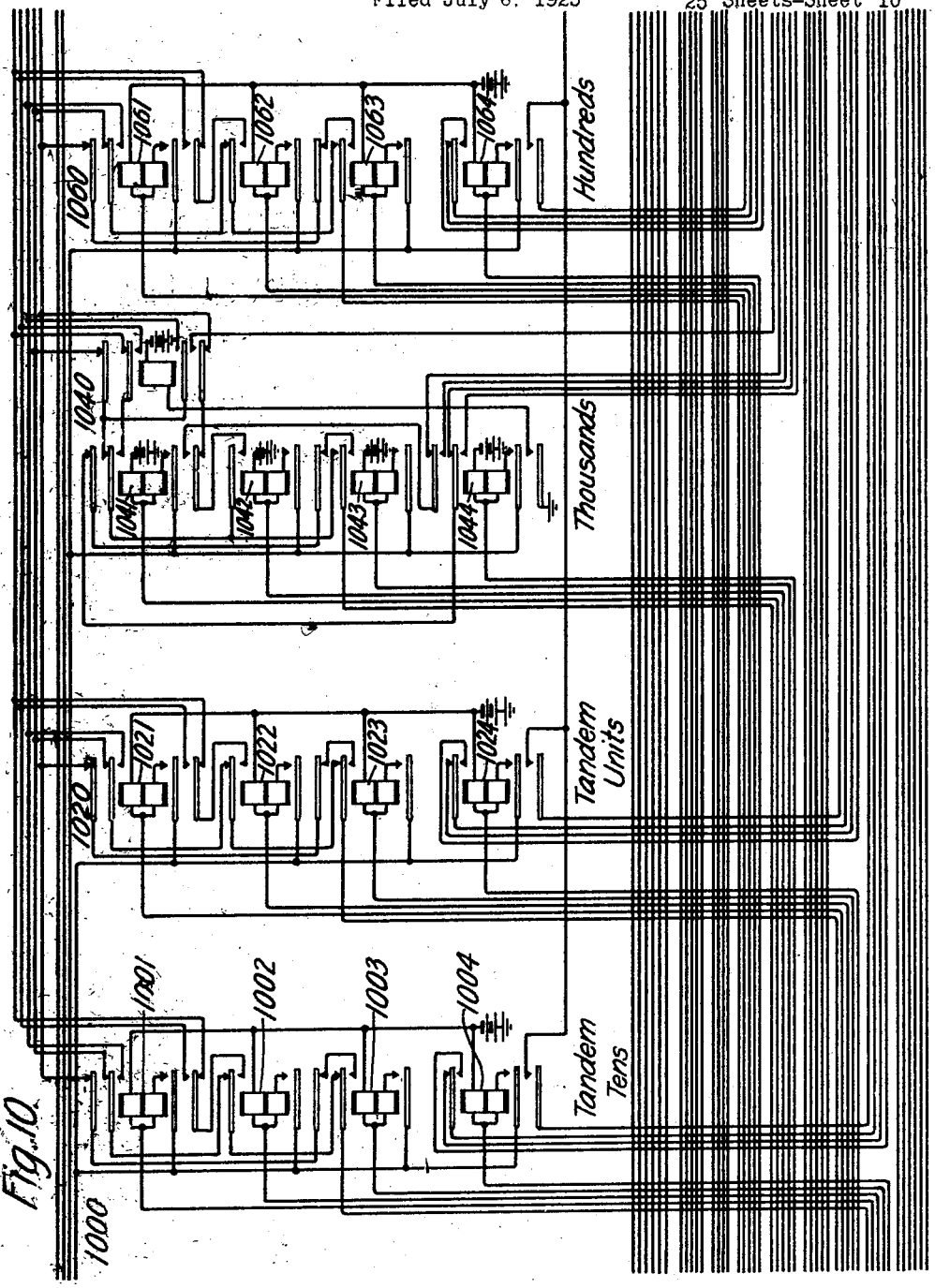
Figure 14:
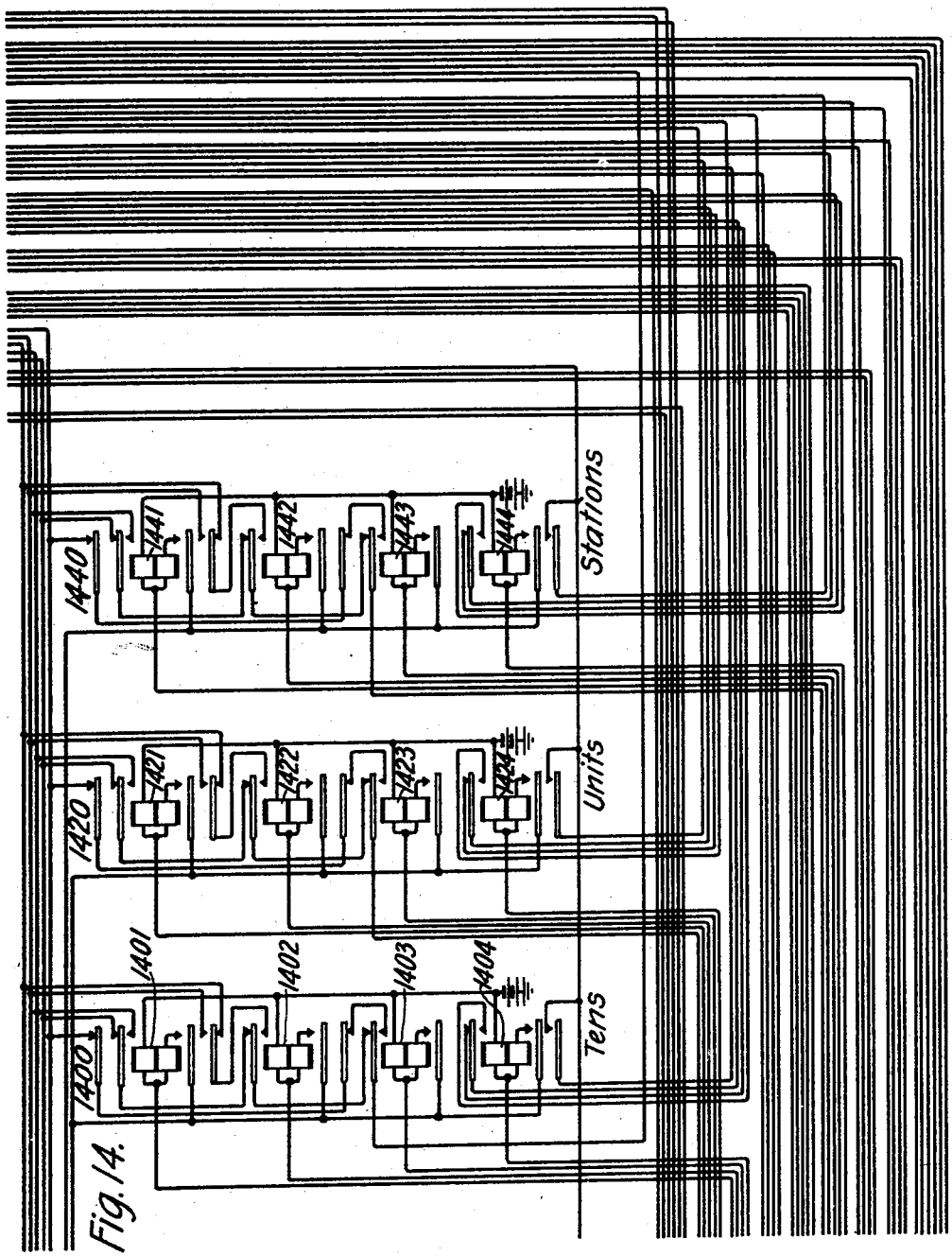

Figs. 10 and 14 show a plurality of relay registers for registering the relay call indicator pulses received from the sender.

Figure 11:
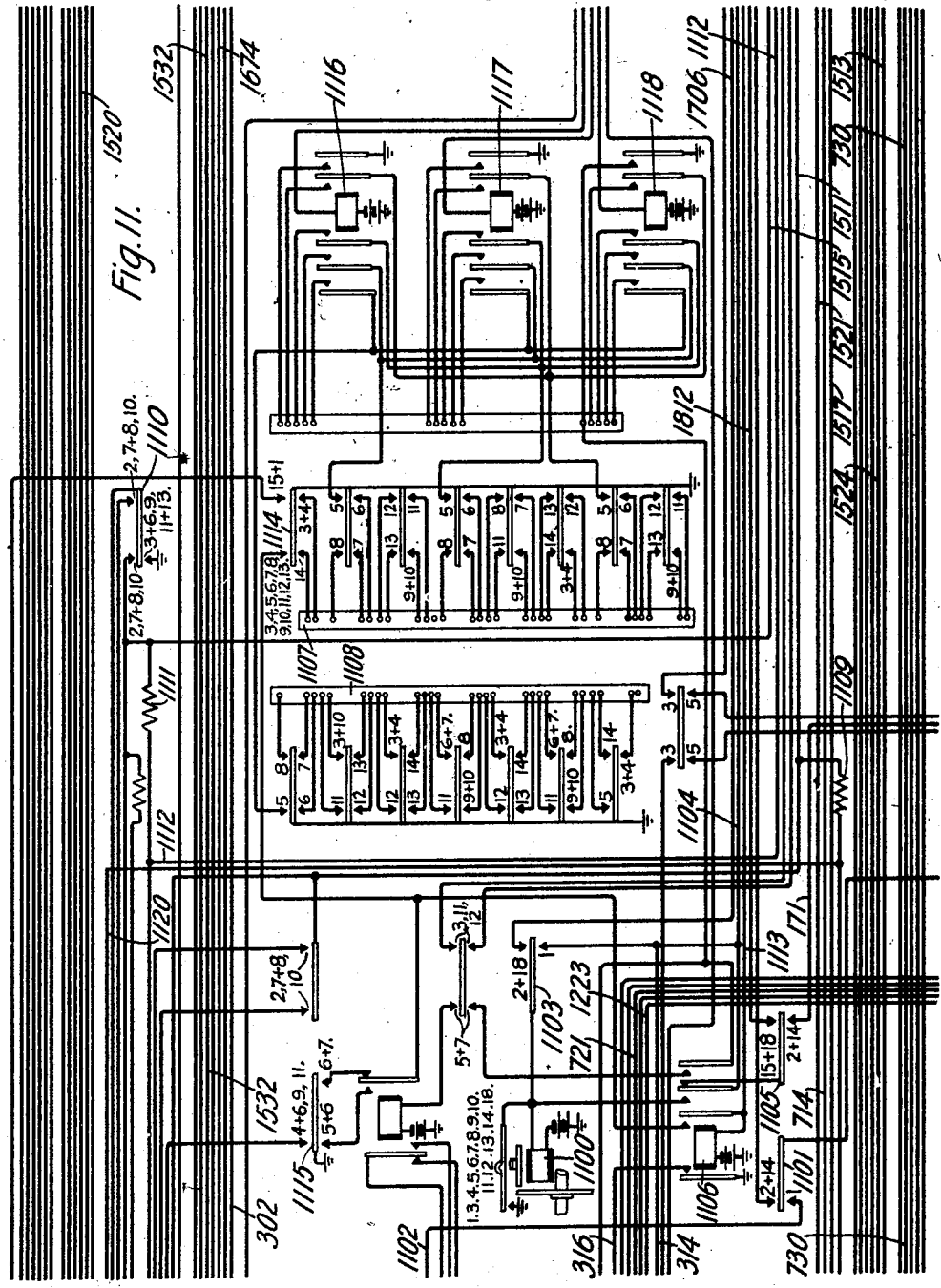

Fig. 11 shows the second sequence switch for controlling the setting of the test registers.

Figure 12:
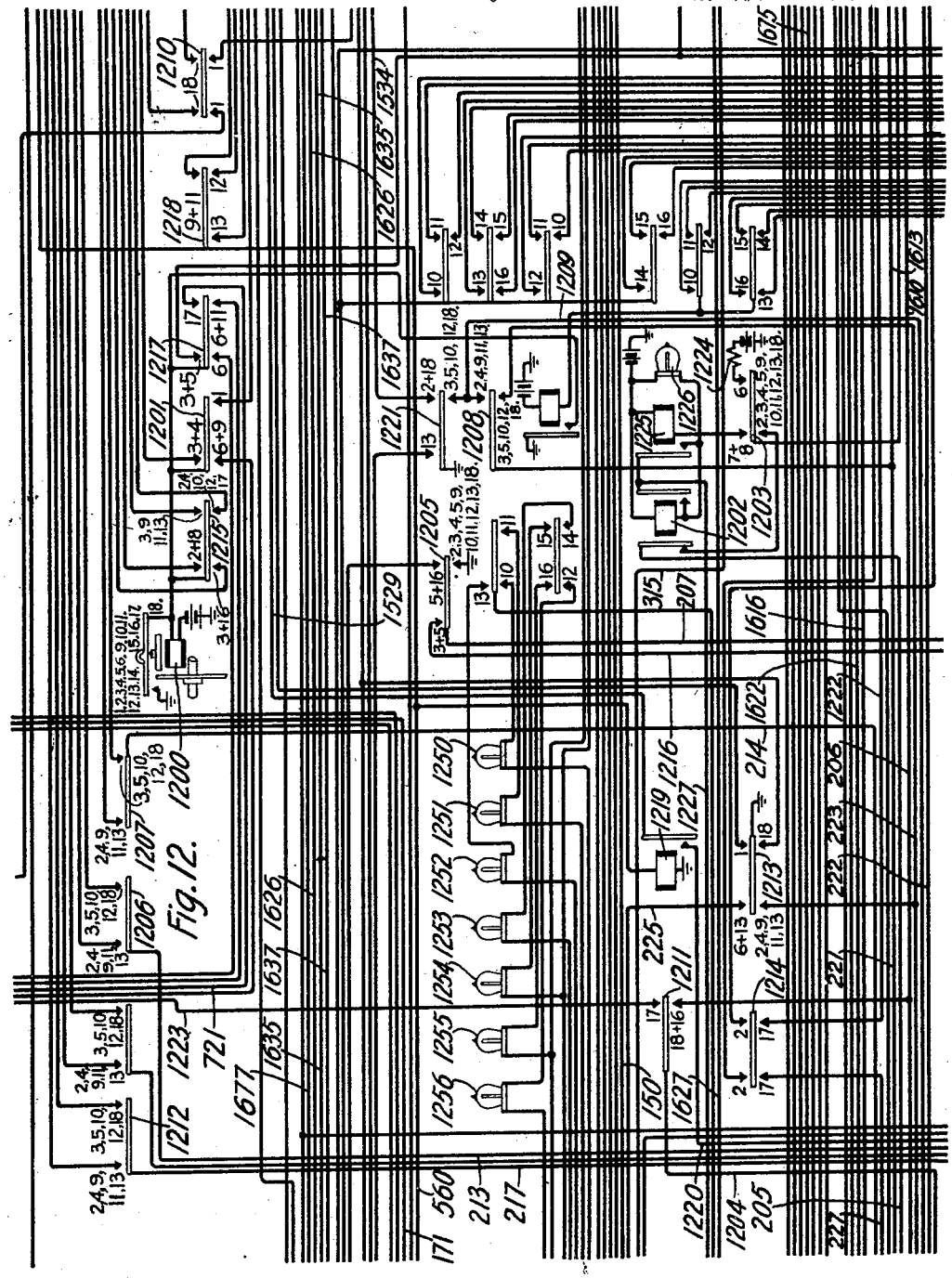
Figure 16:
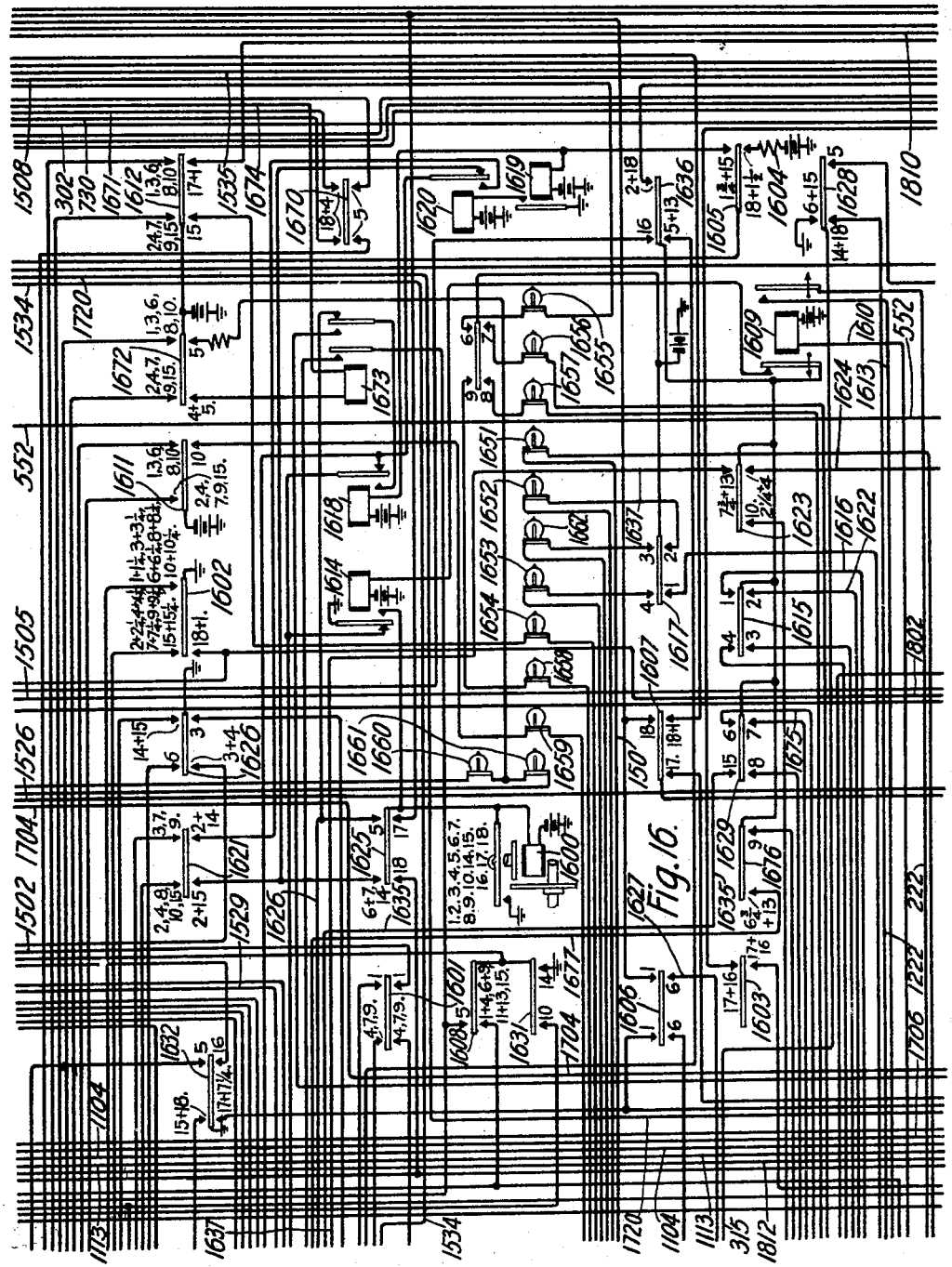

Figs. 12 and 16 show a pair of sequence switches and other control apparatus used in checking the operation of the sender.

Figure 13:
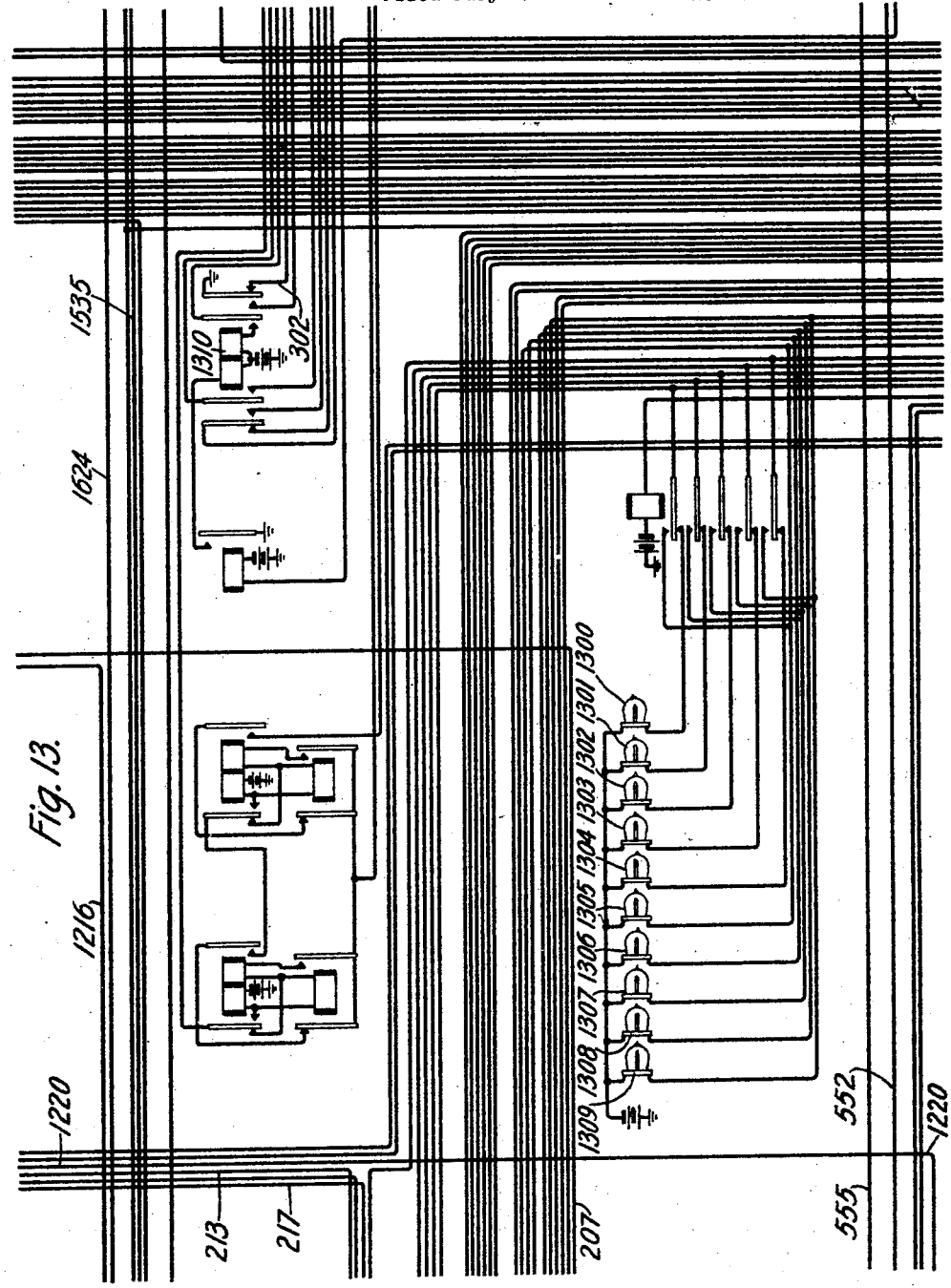

Fig. 13 shows a set of relays for counting the repetitions of tests, and a set of lamps for indicating digits received in relay call indicator operation.

Figure 15:
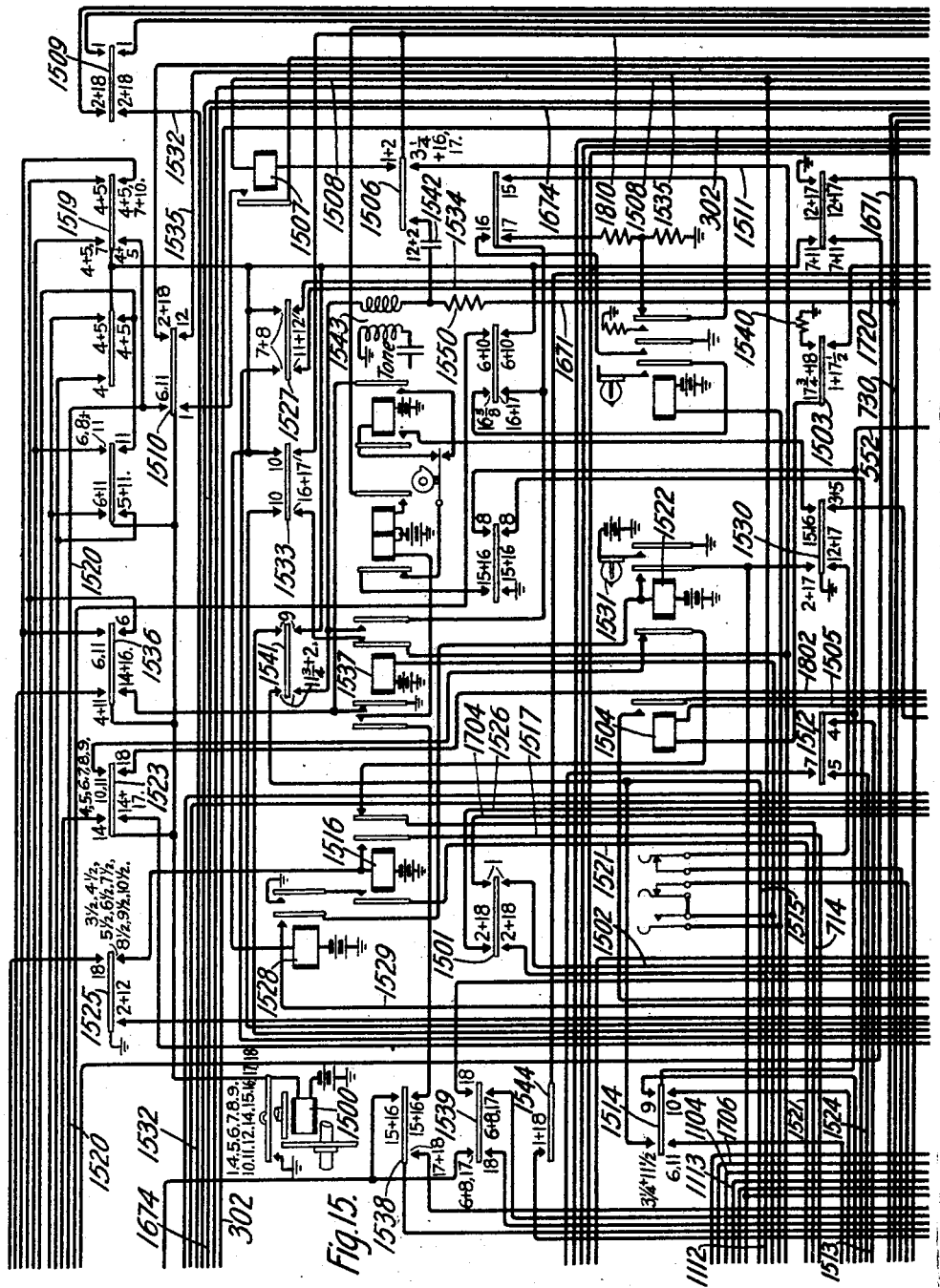

Fig. 15 shows a sequence switch and other apparatus employed in the setting of the sender registers.

Figure 17:
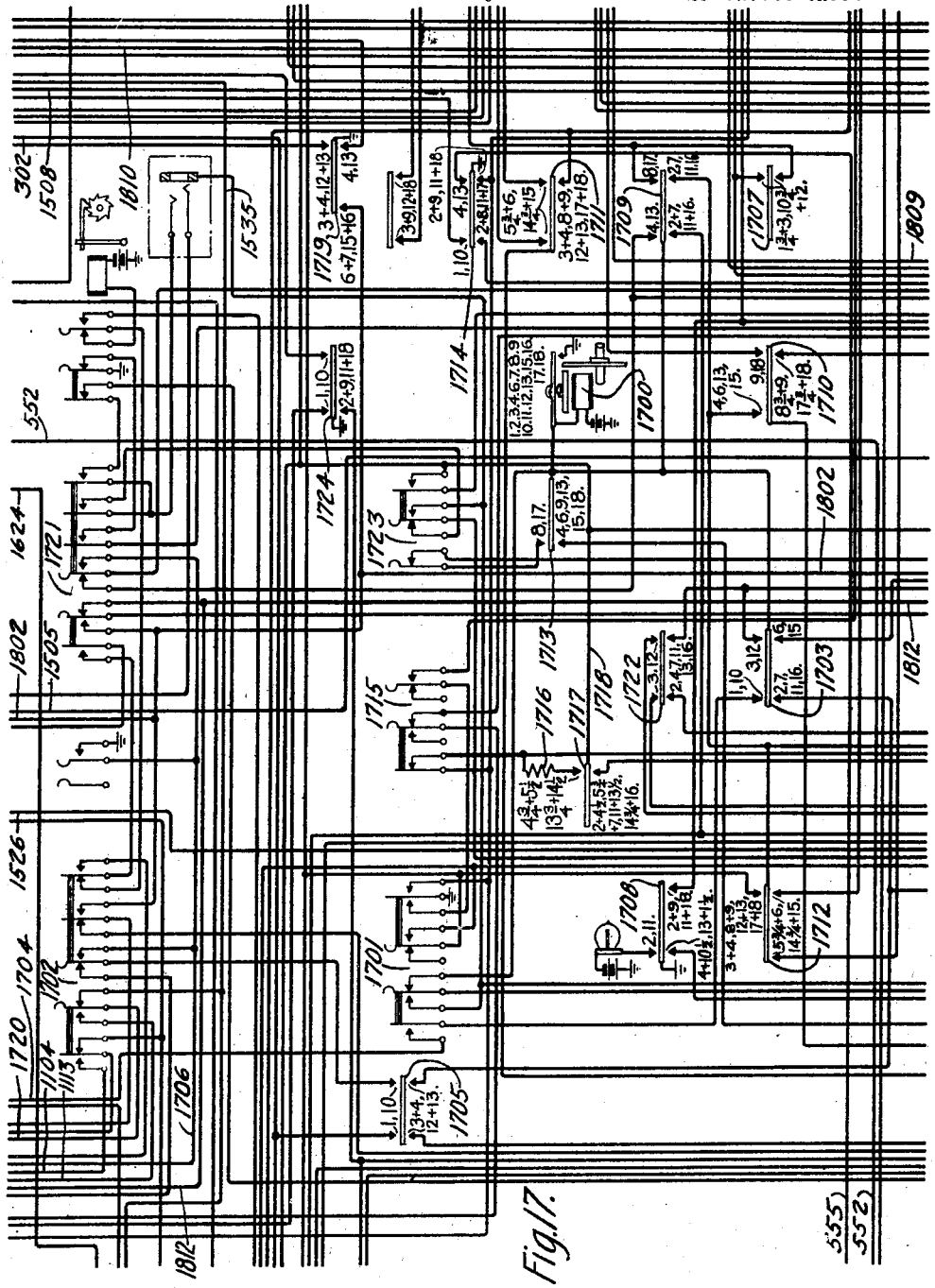
Figure 18:
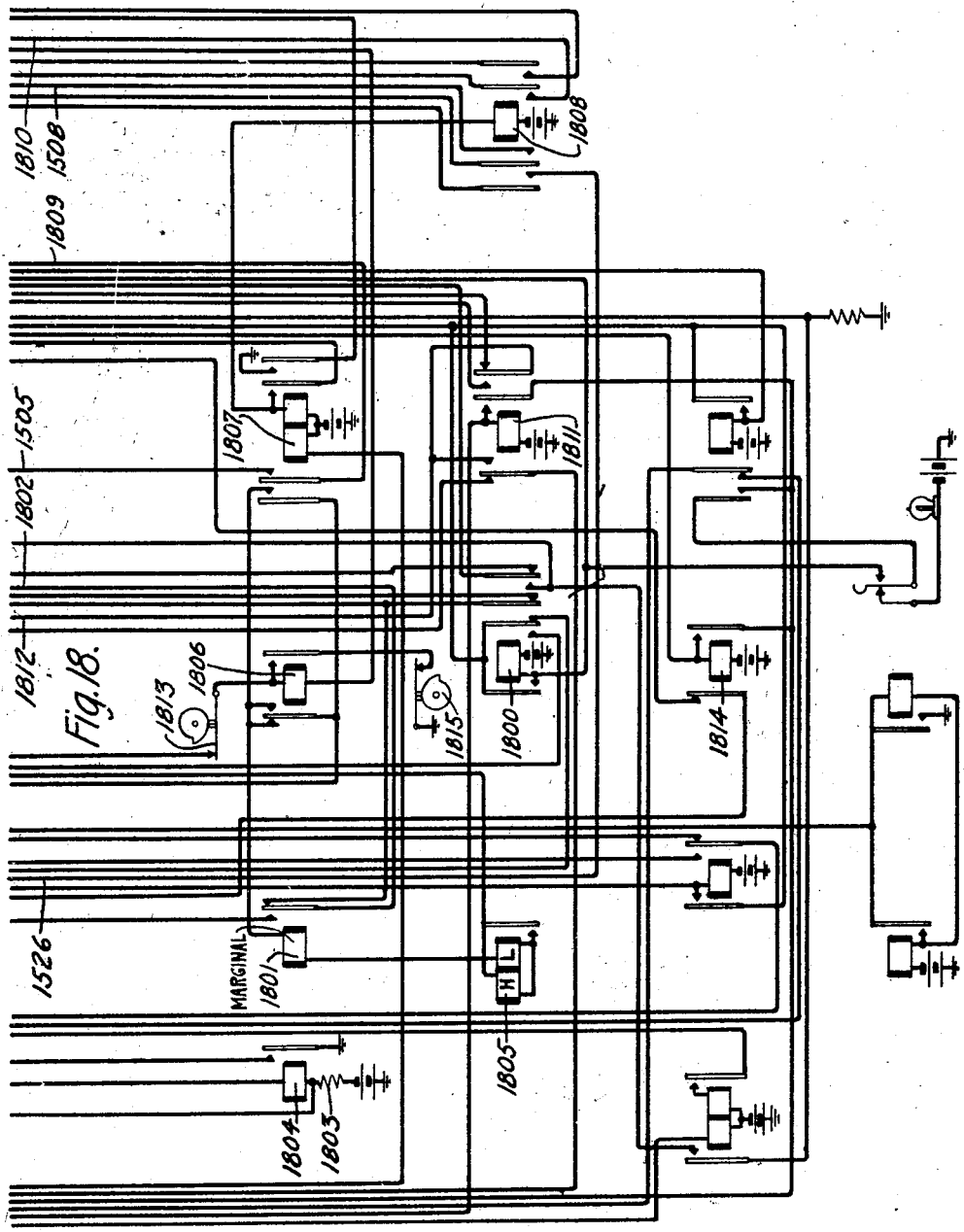

Figs. 17 and 18 show a sequence switch and other apparatus, employed in connecting with the desired sender, as well as a plurality of keys for varying the type of test to be made.

Figure 19:
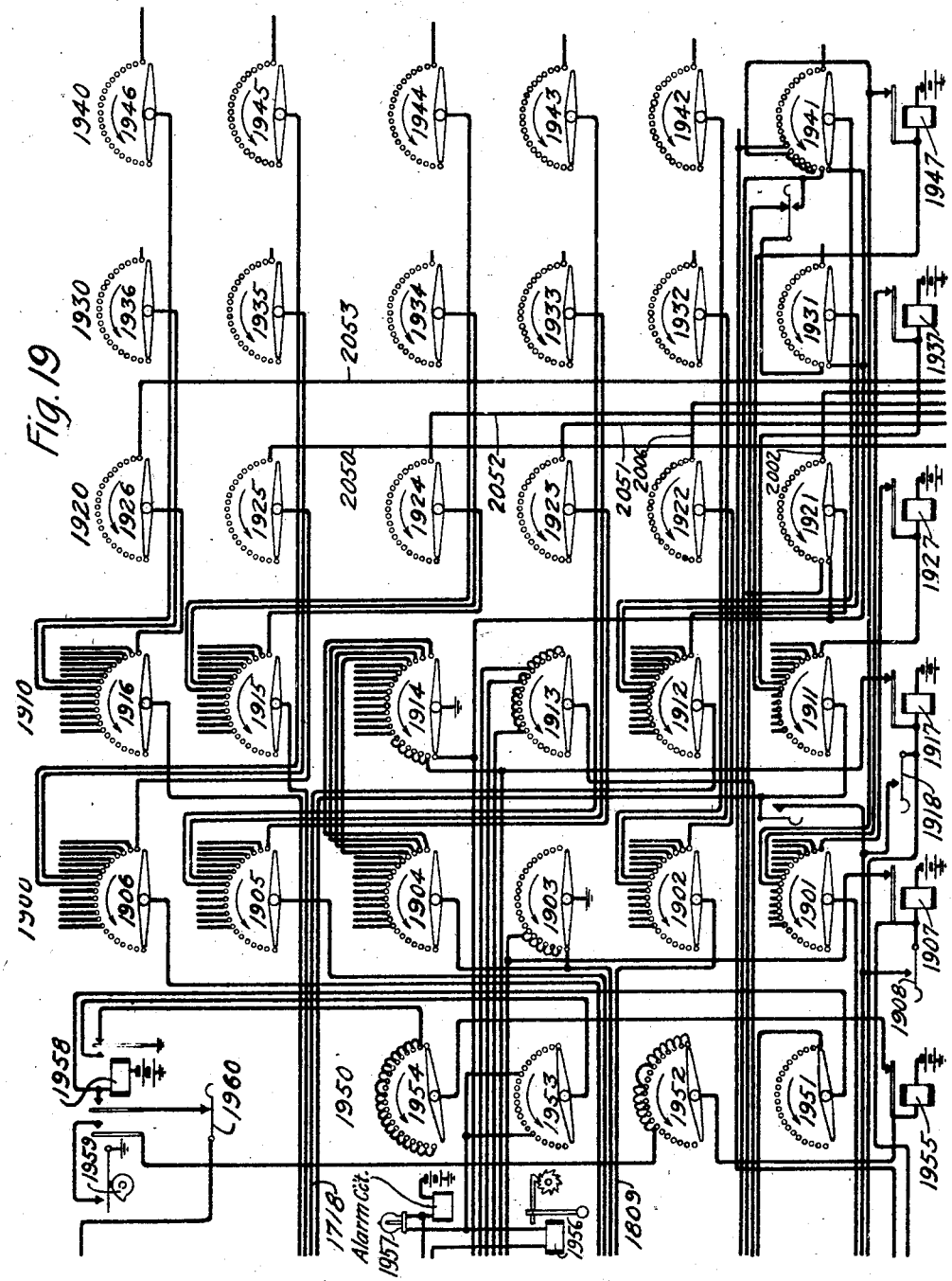

Fig. 19 shows a pair of master switches and a plurality of sender selector switches for connecting the test circuit with a sender to be tested. At the left side a timing switch is also shown.

Figure 20:
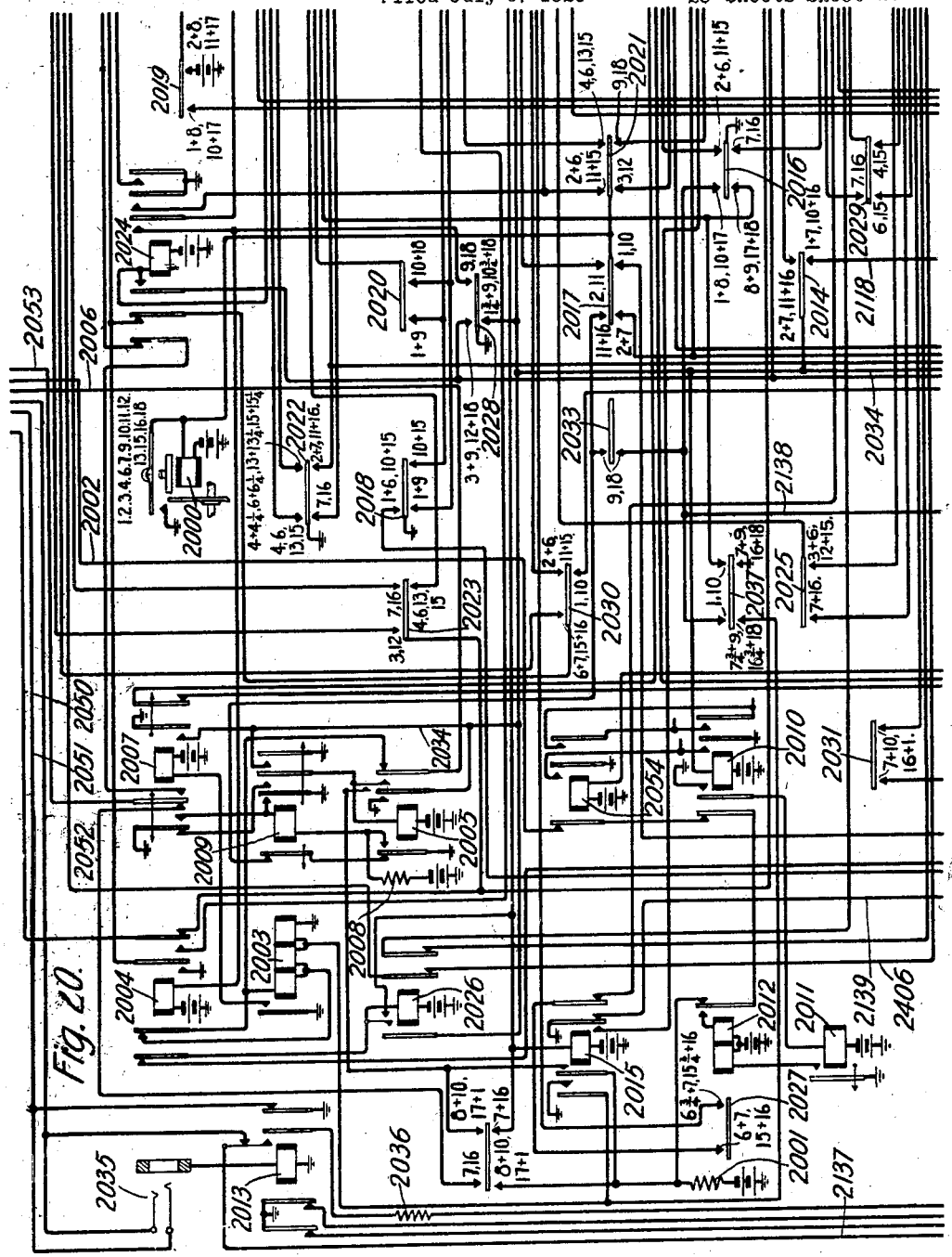
Figure 21:
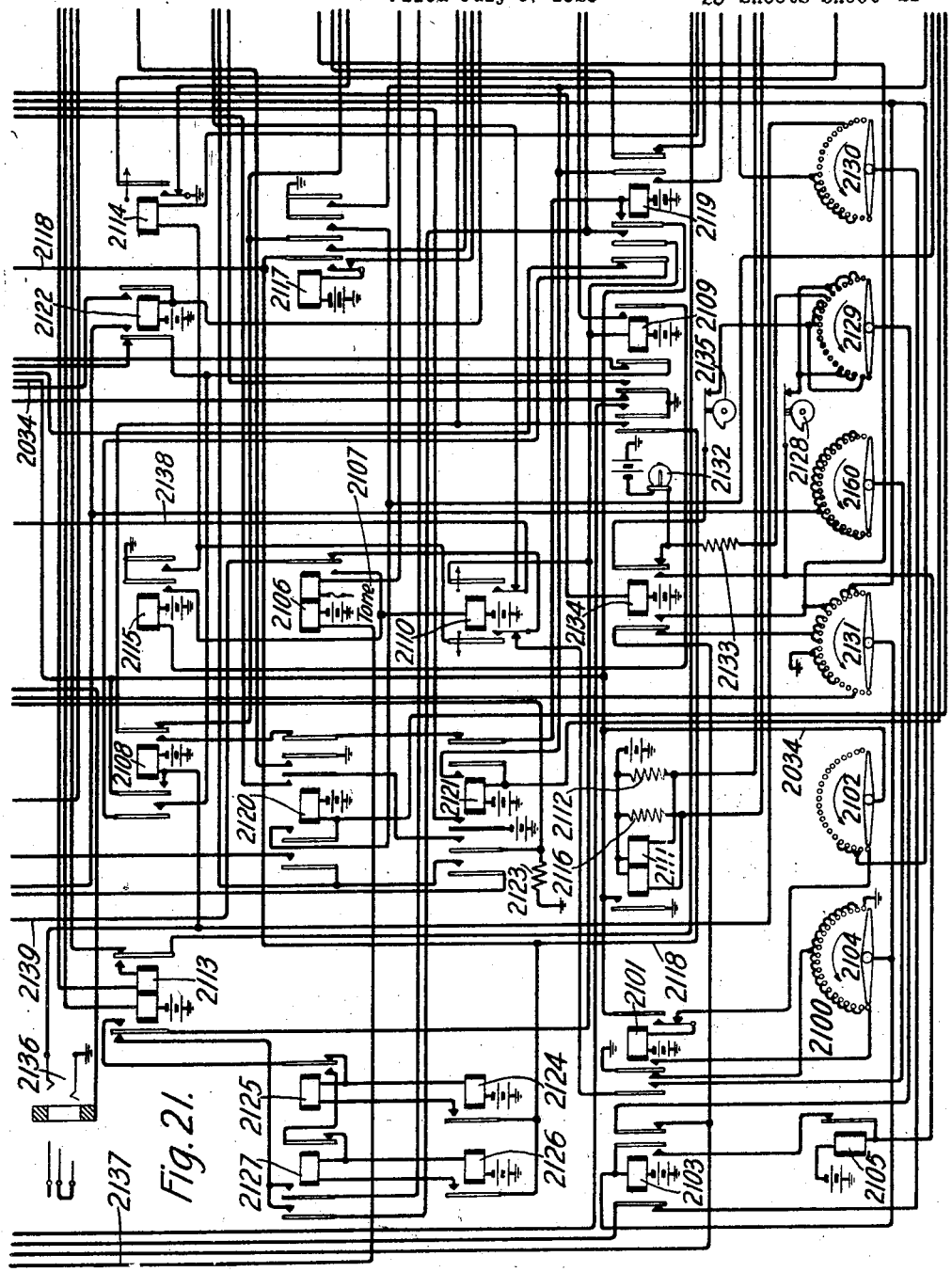
Figure 22:
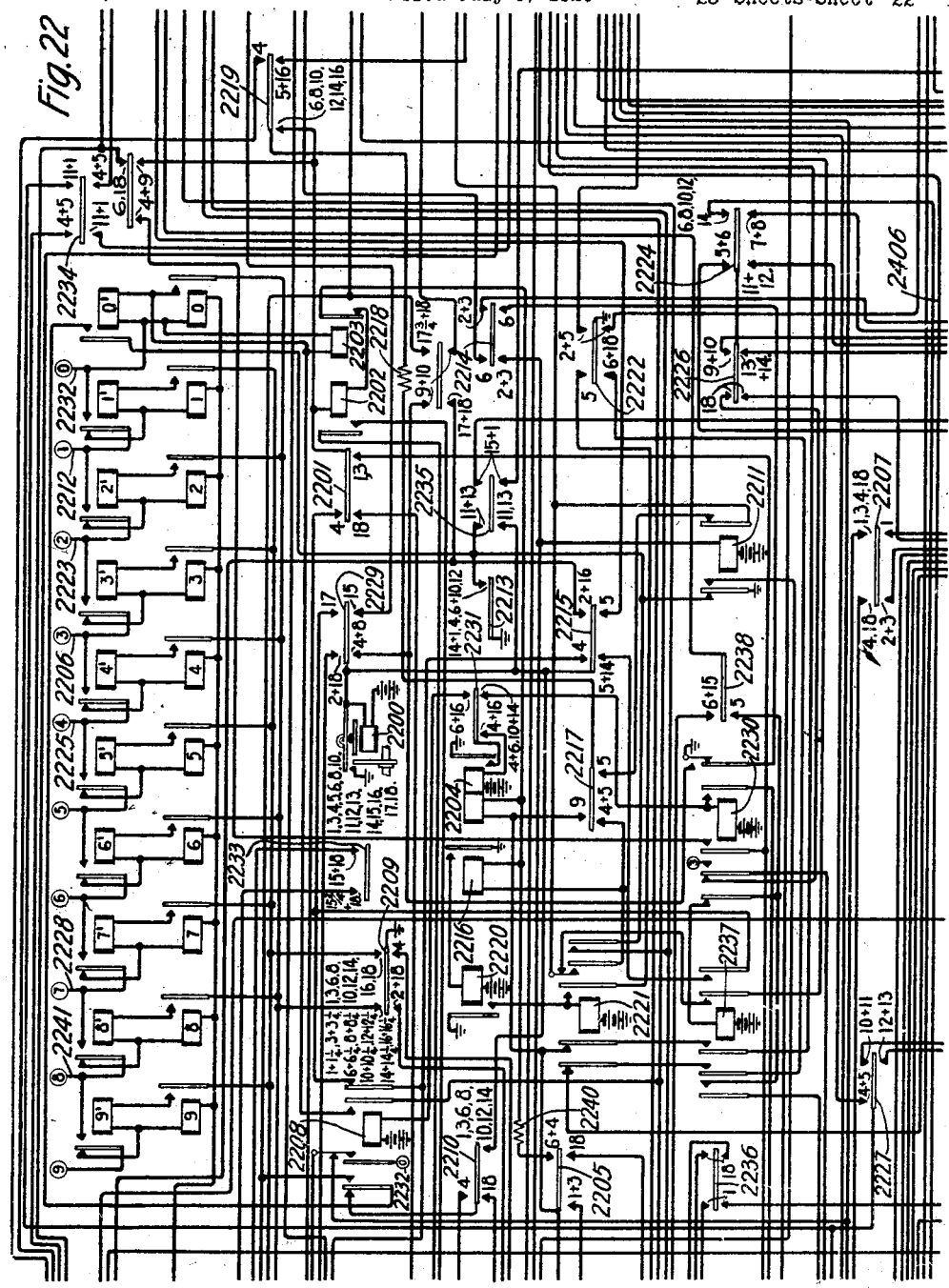

Figs. 20, 21 and 22 show the sequence switches and apparatus for controlling the registration of the wanted number and for controlling selections.

Figure 23:
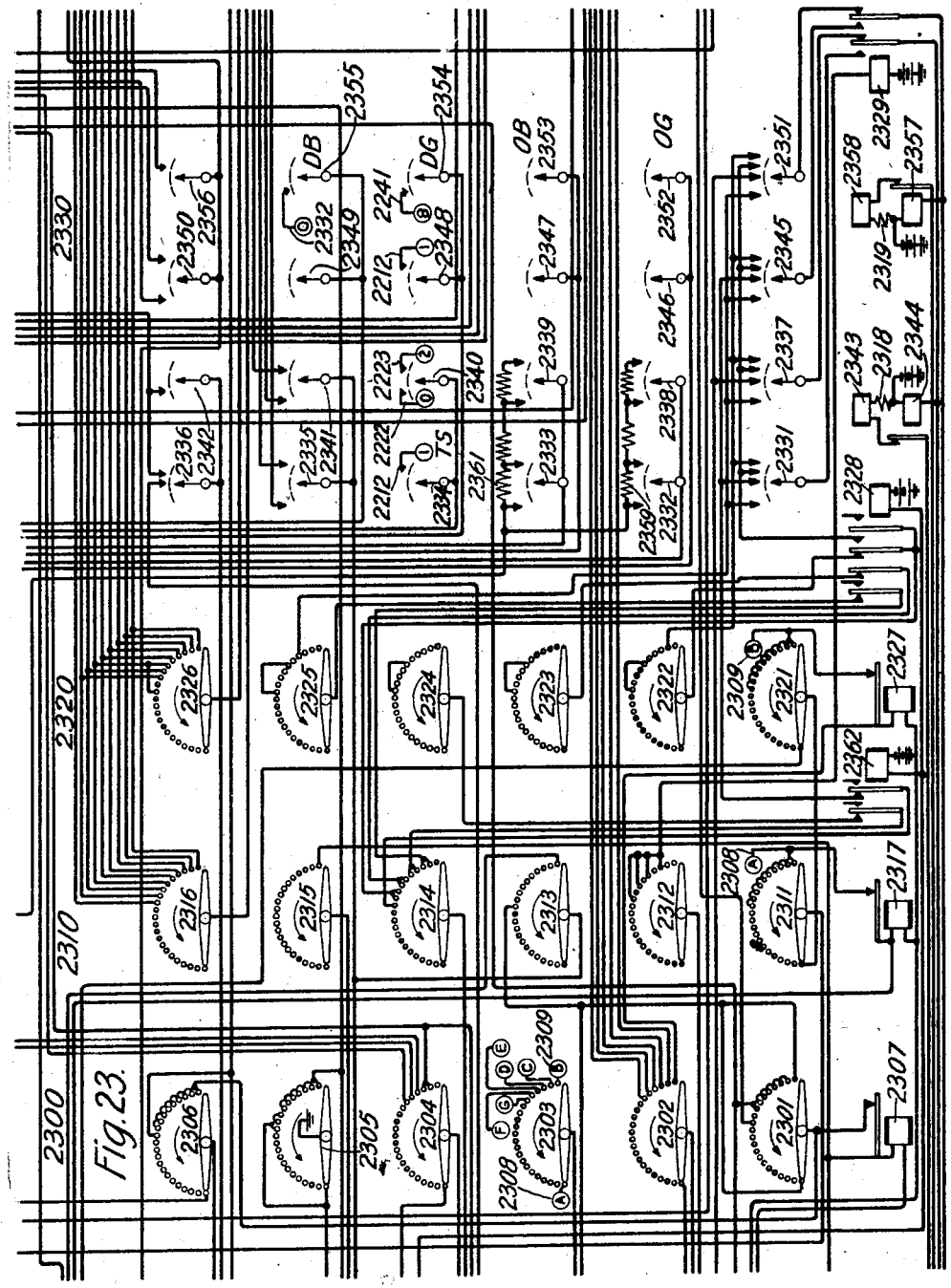

Figs. 23 and 25 show the sender registers and the translator controlled thereby.

Figure 24:
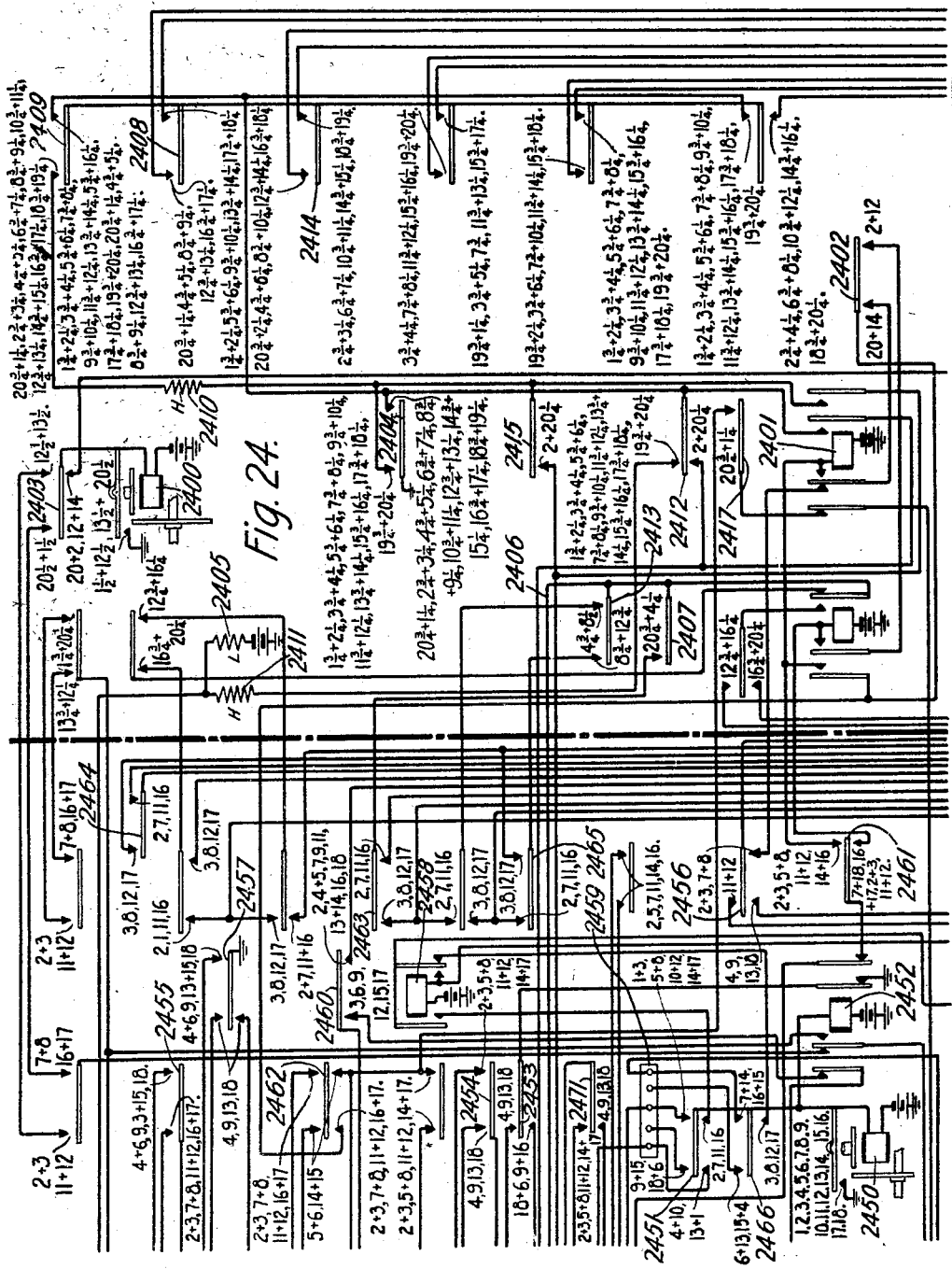

Fig. 24 shows the class sequence switch, and the relay call indicator impulse sequence switch.

Brief description.

A test is started by the operation of start key 1701. If the usual routine multi-test is to be made, multi-test key 1702 will also be operated. The operation of key 1701 completes a circuit through normal contacts of the various sequence switches to advance sequence switch 1700 out of position 1. Sequence switch 1700 in its various subsequent positions controls the advance of the master switches 1900 and 1910 to connect with the first sender selector 1920; the advance of the sender selector to the first sender; and the test of the busy or idle condition of the sender. When the sender becomes idle the route control switch 1100 is advanced to position for the first test and the district, office and code registers of the test circuit are positioned. The positioning of these registers advances the numerical control switch to position for the first test and the numerical registers are positioned in turn. When these registers have come to rest, the registration controlling sequence switch 1500 is advanced. One of the dialing interrupters of the sequence switch type, 500 or 550 is then employed to transmit impulses to the sender to set the registers thereof. The interrupter contact of the dialing interrupter is opened ten times during a revolution and would send ten pulses to the sender were it not for a shunt through the proper register which is maintained until only the desired number of pulses remain to be sent. The sequence switch 1500 is normally advanced after each revolution of the dialing interrupter. However, the circuit for causing this advance is controlled by the class sequence switch 700 so that, in connection with certain classes of calls, the dialing of certain digits is delayed until the selections, corresponding to the previously registered digits, have been checked.

The fundamental circuit through the testing apparatus is prepared as soon as sequence switch 1500 reaches position 2 and hence is ready as soon as the sender is ready to make selections. Selections are checked under the control of sequence switches 1200 and 1500, these sequence switches advancing after the checking of each selection. At the completion of selections the route control switch is advanced to the next test and the sender operation for that type of call tested. The sender is tested for operation on eleven typical calls after which the sender selector is advanced to the next sender. After all of the senders attached to the first sender selector have been tested the master selectors are advanced to the next sender selector and tests made on the senders connected therewith. Senders equipped with means for making coin tests are connected to separate sender selectors, and circuits are provided, when the master switches are connected therewith, which bring about the testing of the sender's ability to make the preliminary coin test and to collect or refund a coin.

For a complete description of the operation of a sender testing device similar to the present disclosure and provided with means for testing coin senders, reference may be made to the Patent No. 1,553,308 granted to W. L. Dodge et al, Sept. 15, 1925.

Detailed description

*Connection with first sender.*—Assuming that a multi-test of all selectors is to be started, start key 1701 and multi-test key 1702 are operated. The operation of key 1702 closes a circuit from battery through the winding of sequence switch magnet 1700, upper left contact of cam 1703, outermost left closed contact of start key 1701, conductor 1704, right contacts of cam 1501, conductor 1502, right contacts of cam 1601, lower contacts of cam 1210, lower contact of cam 1101, conductor 1102, contact of cam 301, conductor 302, right back contact of relay 1310 to ground. The advance of sequence switch 1700 to position 2 in this circuit checks the fact that all sequence switches of the test circuit are in position 1. When position 1¾ is reached a circuit is closed from battery, winding of relay 1800, contacts of cam 1707, normal contact of brush 1914 to ground. Relay 1800 operates and locks over its left front contact, right contact of cam 1708 to ground. The operation of relay 1800 closes a circuit from battery through the winding of sequence switch magnet 1700, lower right contact of cam 1709, inner right front contact of relay 1800 to ground at the right contact of cam 1708, advancing sequence switch 1700 to position 3. Sequence switch 1700 then advances to position 4 in a circuit from battery through the winding of the sequence switch magnet, upper right contact of cam 1703, right back contact of relay 1801, conductor 1802, lower contact of cam 1602 to ground. A circuit is now closed from battery through resistance 1803, winding of relay 1804, upper left contact of cam 1710, inner right front contact of relay 1800, right contact of cam 1708 to ground. The operation of relay 1804 closes a circuit through the winding of sequence switch 1700, lower contact of cam 1713, front contact of relay 1804 to ground, advancing sequence switch 1700 from position 4. Sequence switch 1700 is advanced to position 6 under the control of its master cam. As it passes through position 5¾, a circuit is completed from battery, through resistance 1803, upper contacts of cam 1711, to the back contacts of stepping magnets 1907 and 1917 of master selectors 1900 and 1910 and from thence to the lower contacts of cam 1712, inner right front contact of relay 1800 to ground at the right contact of cam 1708. Stepping magnets 1907 and 1917 are also energized over their back contacts and the subsequent part of this circuit.

When sequence switch 1700 arrives in position 6 the energizing circuit for relay 1804 is again completed. Stepping magnets 1907 and 1919 energize in the circuits traced for them and attract their armatures. The shunt circuits over the back contacts of the stepping magnets, around the winding of relay 1804, prevent that relay from operating when switch 1700 reaches position 6 unless or until the stepping magnets have both completely operated. The operation of relay 1804 closes a circuit from battery, winding of sequence switch magnet 1700, lower left contact of cam 1713, front contact of relay 1804 to ground advancing switch 1700 to position 7. When switch 1700 leaves position 6 the energizing circuits of magnets 1907 and 1917 are opened and these magnets release bringing their brush sets to rest on their No. 1 terminals.

Switch 1700 is then advanced to position 8 in a circuit through its winding, lower right contact of cam 1709, inner right front contact of relay 1800 to ground at the right contact of cam 1708. A circuit is now provided for advancing switch 1700 to position 9 as a check on the position of the sender selector connected to the No. 1 terminals of the master selectors. This circuit may be traced from battery through the winding of sequence switch magnet 1700, upper right contact of cam 1709, normal contact of sender selector brush 1921, No. 1 terminal of master selector brush 1912, conductor 1718, outer right front contact of relay 1800, lower left contact of cam 1714 to ground. Should sender selector 1920 not be in its normal position this circuit will not be completed and switch 1700 will remain in position 8. With switch 1700 in position 8 a circuit is closed from battery through the winding of stepping magnet 1927 of sender selector 1920, No. 1 terminal of master selector brush 1911, upper contact of cam 1712, inner right front contact of relay 1800 to ground at the right contact of cam 1708. A circuit in shunt of the winding of relay 1804 is also closed extending from battery through resistance 1803, lower contact of cam 1711, master selector brush 1901 and its No. 1 terminal, back contact of stepping magnet 1927 and thence over the energizing circuit for magnet 1927 to ground.

Magnet 1927 energizes and, when it completely attracts its armature, opens the shunt around the winding of relay 1804. The circuit of this relay is completed, as soon as switch 1700 reaches position 9, extending from battery through resistance 1803, winding of relay 1804, upper right contact of cam 1710, master selector brush 1904 and its No. 1 terminal, master selector brush 1914 and its No. 1 terminal to ground. The operation of relay 1804 closes the previously traced circuit for sequence switch magnet 1700 and the sequence switch is advanced to position 10 which is a second normal position. When switch 1700 leaves position 9 the circuit of magnet 1927 is opened and it retracts its armatures to step its brushes to its No. 1 terminals. The locking circuit of relay 1800 is also opened at this time and that relay releases. With switch 1700 in position 10 the previously traced circuit by which it was advanced out of position 1 is again closed and the switch advances to position 11.

*Testing sender for busy or idle condition.*—In position 11 a circuit is established for testing whether the sender, with which the testing circuit has been connected, is busy or idle. An idle sender is characterized by battery through a resistance of 150 ohms connected to conductor 2002, and a busy sender by the absence thereof. The testing apparatus establishes a circuit from ground at the outer right operated contact of start key 1701 or from the lower right contact of cam 1714 over the outer left normal contact of key 1715, through both windings of relay 1805, winding of relay 1801, back contact of relay 1806, lower contact of cam 1717, conductor 1718, master selector brush 1912 and its No. 1 terminal, sender selector brush 1921 and its No. 1 terminal to conductor 2002. If the sender is idle this circuit may be further traced over the back contact of relay 2054, back contact of relay 2010, back contact of relay 2012, resistance 2001 to battery. The completion of this circuit causes the operation of relay 1805, which immediately closes a shunt around its high resistance winding thus reducing resistance in the circuit sufficiently to permit the operation of the marginal relay 1801. Relay 1801 in operating closes a circuit from battery through the winding of sequence switch magnet 1700, lower left contact of cam 1703, front contact of relay 1801, conductor 1802, to ground at the lower contact of cam 1602, advancing sequence switch 1700 to position 12. With relay 1801 operated, and sequence switch 1700 in position 12, a circuit is closed from battery, left winding of relay 1807, lower contacts of cam 1705, front contact of relay 1801, conductor 1802 to ground at the lower contact of cam 1602. Relay 1807 operates and locks through its right winding and inner right front contact, inner left normal contact of key 1715, contacts of cam 1603, upper contact of cam 1719 to ground.

The operation of relay 1807 also closes a circuit from battery through the winding of relay 1808 over the inner right front contact of relay 1807 and the locking circuit of relay 1807 to ground. The operation of relay 1807 also closes a circuit from battery through resistance 1604, lower contact of cam 1605, lower contact of cam 1503, winding of relay 1504, conductor 1505, inner left contact of relay 1807, conductor 1809, master selector brush 1902, sender selector brush 1922, conductor 2006, outer right back contact of relay 2005, inner left back contact of relay 2004, middle and right windings of relay 2003, to ground. Relays 2003 and 1504 operate in this circuit. The operation of relay 1504 performs no useful function at this time. However, the operation of relay 2003 closes an obvious circuit for relay 2007 which in turn closes a circuit from battery, through resistance 2008, winding of relay 2009, outer left front contact of relay 2007 to ground. Relay 2009 operates and locks over its inner right front contact to ground. Relay 2007 also closes a circuit from battery through the winding of relay 2010, conductor 2034, inner right front contact of relay 2007 to ground. The operation of relay 2010 closes an obvious circuit for relay 2011, which in turn closes a circuit through the left winding of relay 2012. The operation of relays 2010 and 2012 opens the test circuit over conductor 2002 at the armature of both relays.

Relay 2007 also closes a circuit from battery, through the winding and right normal contact of relay 2101, normal contact of timing switch brush 2102, conductor 2034 to ground at the inner right contact of relay 2007. The operation of relay 2101 closes a circuit from battery, through the winding of relay 2103, normal terminal of brush 2104 of timing switch 2100, inner left front contact of relay 2102 to ground. Relay 2103 operates and closes a circuit through the winding of stepping magnet 2105 and its back contact, front contact of relay 2103, brush 2104 and its normal terminal to ground at the inner right contact of relay 2101. Magnet 2105 operates and steps switch 2100 to its first terminal. The further operation of the timing switch is as described in the above identified Patent of O. H. Kopp.

The opening of the test circuit over conductor 2002 as above described causes the release of relays 1801 and 1805. The release of relay 1801 closes a circuit from battery, through the winding of sequence switch magnet 1700, upper right contact of cam 1703, back contact of relay 1801, conductor 1802 to ground at the lower contact of cam 1602. Sequence switch 1700 is advanced to position 13 in this circuit in which position it remains throughout the test.

The operation of relay 1808 as previously described extends the tip and ring conductors from the sender through to the testing apparatus. With switch 1700 in position 13 a circuit is closed from battery, through the left winding of pulsing relay 2106, conductor 2137, inner right normal contact of relay 2013, conductor 2052, brush 1924, brush 1915, inner right front contact of relay 1808, conductor 1810, upper contact of cam 1506, winding of relay 1507, conductor 1508, inner left front contact of relay 1808, brush 1905, brush 1923, conductor 2051, to ground at the outer right contact of relay 2013. Relays 1507 and 2106 operate in this circuit.

*First test call—full mechanical*

*Setting of test registers.*—The operation of relay 1807 also closes a circuit from battery through the winding of route control sequence switch magnet 1100, lower contact of cam 1103, conductor 1104, outer right operated contact of multi-test key 702, upper contacts of cam 1606, right contacts of cam 1509, outer right front contact of relay 1807 to ground. Sequence switch 1100 advances to position 3 in this circuit. A circuit is now closed from battery through the winding of relay 170, conductor 171, lower contact of cam 1105, right back contact of relay 1106, conductor 1104 and thence as traced over the operating circuit of magnet 1100 to ground at the outer right contact of relay 1807. Relay 170 in operating connects battery to one terminal of the relays 101, 121, 141, 401, 421 and 441. With sequence switch 1100 in position 3 ground is supplied through cross-connecting racks 1107, and 1108 to cross-connecting racks 102, 122, 142, 402, 422 and 442 for the purpose of positioning the corresponding register, namely, district brush register 100, district group register 120 office brush register 140, office group register 400, A code register 420 and B code register 440.

Let it be assumed that the cross-connecting racks between 1107 and 1108 and those previously enumerated are such as to cause switch 100 to be set in position 1, switch 120 in position 9, switch 140 in position 6 (which corresponds to a skip office routing), switch 400 not set, switch 420 in position 3 and switch 440 in position 5. As each register comes into the set position, the ground from the cross-connecting rack 1107 or 1108 which caused the operation of the register magnet will be transferred to the winding of the associated relay. Since the other terminal of these relays is already connected to battery they will operate and close a series circuit from ground over the front contact of relay 101, front contact of relay 121, front contact of relay 141, contact of cam 143, front contact of relay 421, front contact of relay 441, conductor 304, upper contact of cam 303, winding of sequence switch magnet 300 to battery, advancing the numerical switch 300 to position 3. This ground connection is also extended over the back contact of relay 305 to the winding of relay 306 and battery, causing that relay to operate and connect battery to one terminal of the windings of relays 351, 381 and 701.

With the numerical switch 300 in position 3 circuits are closed from battery through cross-connecting rack 307 and cross-connecting racks 352 and 382, to the windings of compensating resistance register 350 and talking selection register 380, respectively. Switch 350 is set in position 7 and switch 380 in position 2.

The following circuits are also closed for positioning the numerical registers: From ground, over the lower right contact of cam 308, right contact of cam 451, winding of thousands register magnet 450, to battery; ground over the lower contact of cam 309, right contact of cam 801, winding of hundreds register magnet 800 to battery; ground over the lower right contact of cam 310, upper right contact of cam 821, winding of tens register magnet 820 to battery; ground over the lower left contact of cam 311, upper left contact of cam 841, winding of units register magnet 840 to battery. Stations register 860 is not set for a full mechanical call. A circuit is also closed from ground over the upper right contact of cam 312, upper left contact of cam 702, winding of class sequence switch magnet 700 to battery. Due to the completion of these circuits the class switch comes to rest in position 2, thousands register 450 in position 10, hundreds register 800 in position 7, tens register 820 in position 9 and units register 840 in position 10.

When switches 350, 380 and 700 come to rest in their set positions, the operating ground is extended to the windings of relays 351, 381 and 701 and these relays operate closing a circuit from battery through the winding of registration control sequence switch 1500, lower left contact of cam 1510, front contact of relay 1507, which is operated in series with relay 2106 of the sender, lower right contact of cam 1607, contacts of cam 842, contacts of cam 822, contacts of cam 802, contacts of cam 452, conductor 570, upper left contact of cam 313, front contact of relay 701, front contact of relay 381, front contact of relay 351, conductor 314, conductor 1104 and thence as traced to ground at the outer right contact of relay 1807. Sequence switch 1500 is advanced in this circuit to position 4. When sequence switch 1500 reaches position 2 it closes a circuit from battery through the winding of sequence switch magnet 1200, right contact of cam 1201, left contact of cam 1525 to ground advancing sequence switch 1200 to position 2.

*Preliminary or false pulse.*—In passing from position 1 to position 4 sequence switch 1500 opens the previously traced circuit of relays 2106 and 1507 permitting relay 2106 to release and register a preliminary false pulse on the sender. When relay 2106 operates as previously described it closes a circuit from battery through the winding of relay 2110, front contact of relay 2106, conductor 2139, inner right back contact of relay 2015 to ground. Relay 2110 operates and closes a circuit from battery through the winding of relay 2109, right front contact of relay 2110, conductor 2138, upper left contact of cam 2016 to ground. As soon as relay 2109 operates, a dialing tone circuit is completed through the right winding of relay 2106 which induces a tone in the dialing circuit.

The release of relay 2106 due to the advance of sequence switch 1500 closes a circuit from battery, through the right winding of relay 2111 and resistance 2112, in parallel, winding of stepping magnet 2317 of the A code register 2310, right back contact of relay 2113, normal terminal of brush 2302 of register control switch 2300, winding of relay 2114, left front contact of relay 2110, right back contact of relay 2106, conductor 2139, to ground at the inner right back contact of relay 2015. Relay 2114 operates and closes a circuit from battery through the left winding of relay 2111 and resistance 2116 in parallel, winding of register control switch magnet 2307, front contact of relay 2114 to ground.

As soon as sequence switch 1500 reaches position 3¼ a circuit is established from battery, through the left winding of relay 2106 to conductor 1810 as previously described and thence over the lower right contact of cam 1506, conductor 1511, resistance 1109, outer right back contact of relay 707, conductor 708, contact of cam 551, conductor 552, upper left contact of cam 1514, conductor 1515, resistance 1111, conductor 1112, conductor 1508 and thence as previously traced to ground at the outer right back contact of relay 2013. A second circuit also exists between conductors 552 and 708 which may be traced from conductor 552 over the lower right contact of cam 1512, conductor 1513, lower right contact of cam 423, right contact of cam 553, to conductor 708. Two substation ringers 703 and 704 are connected from this circuit to ground at the lower contact of cam 1110 simulating service conditions.

Relay 2106 reoperates in this circuit, reclosing the circuit of relay 2110 which, being slow to release has not retracted its armatures. The reoperation of relay 2106 opens the circuit through magnet 2317 and relay 2114 permitting the magnet 2317 to retract its armature and advance the brushes to their No. 1 terminals. Relay 2114, being slow to release, does not open the circuit of magnet 2307 until after switch 2310 is advanced, at which time a holding circuit for magnet 2307 is closed over the No. 1 terminal of brush 2315, right back contact of relay 2108, outer left front contact of relay 2109, conductor 2118, lower contact of cam 2014 to grounded conductor 2034. This circuit prevents magnet 2307 from releasing its armature and advancing the register control switch to position 1.

*Setting sender code registers.*—Sequence switches 500 and 550 are employed as dialing interrupters in the manner described in the above identified patent of William L. Dodge et al. Cams 501 and 551 are cut so as to provide ten open positions, the remainder being closed. These positions simulate dial pulses, switch 500 being controlled to send out pulses at the minimum speed and switch 550 at the maximum speed met in service dials. The high speed interrupter is normally employed, but for certain ones of the tests circuits are provided for operating relay 707, transferring the leads to low speed interrupter 500. If it is desired to make all tests with the low speed interrupter, key 709 may be operated holding relay 707 operated. If it is desired to make all tests with the high speed interrupter, key 710 may be operated, preventing the operation of relay 707 except in positions 9 and 10 of switch 300.

When switch 1500 reached position 3½ an obvious circuit was closed for relay 1516. This relay locked over its right front contact, conductor 1517, inner back contact of relay 707, conductor 711, right contact of cam 554, conductor 555, upper right contact of cam 1714 to ground. When switch 1500 reaches position 4, a circuit is closed from battery through the winding of relay 1528, lower left contact of cam 1519, conductor 1520, left contact of cam 712 to ground. The operation of relay 1528 closes a circuit from ground over its outer right contact, left contact of relay 1516, conductor 1521, next to the outer back contact of relay 707, conductor 713, contact of cam 556, winding of sequence switch magnet 550 to battery. This circuit advances switch 550 out of position 1 and it continues back to position 1 under the control of its master cam.

As it passes through positions 3, 4, 5, etc., to 12 the contact of cam 551 is opened as previously described. Until switch 550 leaves position 10¼ the shunt over the contact of cam 553 and cam 423 is maintained, but when switch 550 passes through positions 11 and 12 this shunt is open and two pulses, or interruptions of the pulsing circuit are transmitted to the sender.

When relay 2114 released as previously described, a circuit was closed from battery through the left winding of relay 2113, No. 1 terminal of brush 2313 to ground at the normal contact of relay 2114. This relay operates and prepares a holding circuit for itself through the left winding of relay 2518 and resistance 2509 in parallel, right winding of relay 2113, right contact of relay 2113, normal terminal of brush 2302, winding of relay 2114, left front contact of relay 2110, back contact of relay 2106, to grounded conductor 2139. When relay 2106 releases in response to the first interruption of its circuit due to interrupter 550, this circuit is completed and relay 2114 operates, opening the energizing circuit of relay 2113. The operation of relay 2114 recloses the original energizing circuit for magnet 2307 but, due to the operated condition of relay 2113, no circuit is closed for magnet 2317. When relay 2106 attracts its armature between interruptions, it opens the holding circuit for relay 2113 and that relay releases. Relay 2114 being slow to release holds its armature attracted during this time. When relay 2106 releases in response to the second interruption of its circuit, it closes a circuit from battery, through the right winding of relay 2111 and resistance 2112 in parallel, winding of stepping magnet 2317, right back contact of relay 2113, normal contact of brush 2302, winding of relay 2114, left front contact of relay 2110, back contact of relay 2106, to grounded conductor 2139. Magnet 2317 operates in this circuit, and when relay 2106 reoperates at the end of the second interruption, it releases its armature and steps the brushes of switch 2310 to their No. 2 terminals. Relay 2106 now remains energized long enough to permit the release of relay 2114, which opens the circuit of magnet 2307 and permits the brushes of switch 2300 to move to their No. 1 terminals, in which position the pulsing circuit controls magnet 2327.

When switch 550 leaves position 2 the locking circuit of relay 1516 is opened and that relay releases. When switch 550 reaches position 13 it extends ground from conductor 555 over the left contact of cam 554, conductor 557, next to the inner back contact of relay 707, conductor 714, back contact of relay 1516 back contact of relay 1522, upper right contact of cam 1523, winding of sequence switch 1500 to battery, advancing sequence switch 1500 to position 5. As switch 1500 passes through position 4½ relay 1516 is reoperated and locked as before described.

The circuit of relay 2106 is restored as soon as the last pulse is sent out and is the same in position 5 of sequence switch 1500 as in position 4. However, the shunt around cam 551 in this case extends from conductor 552, over the lower left contact of cam 1512, conductor 1524, upper left contact of cam 443, upper contact of cam 558 to conductor 708. Since the circuit of relay 1528 is maintained through position 5 the operation of relay 1516 starts switch 550 on its second revolution. The shunt above described is maintained through position 8½ of switch 550 so that pulses are sent out in positions 9, 10, 11 and 12. With the exception of the absorption of the first pulse, the setting of the register 2320 is the same as described for register 2310. As before when switch 550 leaves position 2 relay 1516 is released, and when it reaches position 13 switch 1500 is advanced to position 6. Since there is no ten thousands digit to the number to be registered, switch 1500 is immediately advanced to position 7 in a circuit from battery through the magnet winding, upper right contact of cam 1536, lower left contact of cam 724 to ground.

*Setting of translator in sender.*—Following the setting of switch 2320 the register control switch 2300 is advanced to its No. 2 terminals. As soon as this takes place, a circuit is closed from battery, winding of relay 2117 and its normal contact, No. 2 terminal of brush 2304, outermost left contact of relay 2109, to ground on conductor 2118. Relay 2117 operates and locks over its innermost front contact to grounded conductor 2118. The operation of relay 2117 closes a circuit from battery through resistance 2318, winding of translator rotary magnet 2343, back contact of stop magnet 2344, outermost front contact of relay 2117 to ground. A second circuit is also closed from battery through resistance 2319, winding of rotary magnet 2358, back contact of stop magnet 2357, next to the outermost contact of relay 2117 to ground.

The translator 2330 consists of two power driven rotary switches which are provided with two sets of brushes arranged opposite one another. Translators of this type have been disclosed in a number of previous applications and reference may be made to the Patent No. 1,550,377 granted to A. E. Lundell Aug. 18, 1925, for such a disclosure. The energization of magnets 2343 and 2358 causes the rotation of the switches constituting the translator 2330. The energization of relay 2117 also closes a circuit from grounded conductor 2118, over the outermost left contact of relay 2109, back contact of relay 2108, next to the innermost contact of relay 2117, brush 2314 and its second off-normal contact, outermost back contact of relay 2328, brush 2325 and its fourth off-normal terminal to a terminal in each terminal bank served by translator brushes 2331, 2337, 2345 and 2351. Since switch 2310 is engaging its No. 2 terminals relay 2329 is not operated and circuit may be traced over brushes 2337, 2351, back contacts of relay 2329 to the windings of stop magnets 2344 and 2357 and battery. These circuits are completed over the above traced circuit extending to the translator terminal banks as soon as brushes 2337 and 2351 encounter the terminals connected to ground thereover. When these circuits are completed magnets 2344 and 2357 operate, opening the circuits of magnets 2343 and 2358 and bringing the translator brushes to rest on the grounded terminals.

Circuits are also completed in parallel with the stop magnets through the windings of relay 2120 and 2121. The operation of relay 2120 closes a locking circuit over its inner left contact to ground at the next to the outermost front contact of relay 2117. Relay 2121 closes a locking circuit for itself over its inner right contact, to ground at the outermost contact or relay 2117. Stop magnets 2344 and 2357 are also held operated in these locking circuits. The operation of relay 2120 closes a circuit from ground at its middle right contact, over the terminal upon which brush 2356 has come to rest, cross-connecting rack 2459, upper right contact of cam 2451, winding of magnet 2450 and relay 2452 in parallel to battery. Class sequence switch 2450 is advanced in this circuit to position 4, 9, 13 or 18 each of which represents a full mechanical class of call. The joint operation of relays 2120 and 2121 also closes a circuit from battery through the winding of sequence switch magnet 2000, lower right contact of cam 2017, outer left contact of relay 2120, outer left contact of relay 2121, upper contact of cam 2018 to ground. The sender control sequence switch 2000 advances to position 2 in this circuit.

*Check of district selections.*—With switch 2000 in position 2 the fundamental circuit for controlling district brush selection is established as follows: battery, through the winding of relay 200, back contact of relay 201, back contact of relay 202, right contact of key 203, left contact of relay 204, conductor 205, back contact of relay 1202, lower contact of cam 1203, lower contact of cam 1608, left contacts of cam 1501, conductor 1526, outer left contact of relay 1808, brush 1906 and its No. 1 terminal, brush 1925 and its No. 1 terminal, conductor 2050, outer right back contact of relay 2004, right contact of cam 2201, winding of stepping relay 2202, back contact of relay 2203, left winding of relay 2204, left contact of cam 2205, innermost right contact of relay 2120, middle left contact of relay 2121, resistance 2123 to ground. Relays 200 and 2202 operate in this circuit, but relay 2204 does not, being polarized.

The operation of relay 200 closes a circuit from battery through the winding of relay 1609, conductor 1610, lower contact of cam 1211, conductor 1204, left contact of relay 200 to ground. Relay 200 also closes a circuit from battery through the left winding of relay 202, conductor 206, lower contact of cam 1211, conductor 1204 to ground at the left contact of relay 200. Relay 202 operates and locks in a circuit through its right winding and its right front contact, right back contact of relay 204, left contact of key 203, conductor 207 to ground at the lower contact of cam 1205. The operation of relay 202 opens the original energizing circuit of relay 200, but relay 200 closes a holding circuit for itself, extending through its winding, back contact of relay 201, middle right contact of relay 200 to grounded conductor 205.

Relay 202 also connects grounded conductor 206 through interrupter 208 over the outer left contact of relay 202, back contact of relay 209, winding of relay 211, conductors 212 and 213, left contact of cam 1206, right contact of cam 1611 to battery. This circuit is completed at the first closure of the interrupter contact and relay 211 operates, closing a locking circuit for itself through the windings of relays 209 and 210, front contact of relay 211, conductor 214, left contact of cam 1207, right contact of cam 1602, to ground. When the interrupter opens its contact, relays 209 and 210 operate in this locking circuit. The operation of relay 210 connects the upper contact of interrupter 208 over the front contact of relay 210, through resistance 215, inner right contact of relay 200, to the fundamental circuit over conductor 205. The operation of relay 209 connects the lower contact of interrupter 208 over the outer left contact of relay 202, front contact of relay 209 to a point between artificial line relay 216 and stepping relay 219, which relays are included in a circuit which may be traced from battery over the upper right contact of cam 1612, left contact of cam 1212, conductor 217, winding of relay 216, resistance 218, stepping relay 219 to grounded conductor 214. This circuit was closed as soon as switch 1200 arrived in position 2.

The operation of relay 219 in this circuit prepares a circuit which was completed when relay 200 operated and which may be traced from battery over the upper right contact of cam 1611, left contact of cam 1206, conductor 213, through the winding of counting relay 270, back contact of relay 271, and thence in parallel over the outer right contact of relay 200, conductor 221, to cam 1208 or over conductor 222, front contact of relay 1609, and conductor 1613 to cam 1208, thence over the upper contact of cam 1208, conductor 1209, front contact of relay 219, conductor 223, lower left contact of cam 1213 to ground.

The operation of relay 2202 as previously described closes a circuit from battery over the right contact of cam 2019, winding of the No. 0 counting relay, conductor 2232, brush 2355 of translator 2330, right contacts of cam 2207, left normal contact of relay 2208, left contact of cam 2020, front contact of stepping relay 2202, left contact of cam 2018 to ground. The No. 0 counting relay operates in this circuit and closes a locking circuit for itself through the No. 0' counting relay and relay 2203 in parallel, contact of the No. 0 counting relay, upper left contact of cam 2209 to ground. The No. 0' counting relay does not operate in this circuit since it is shunted by the energizing circuit in the No. 0 counting relay in the usual manner.

Each time that interrupter 208 now closes its contacts, it shunts the stepping relay of the sender and of the test circuit. Each time that the stepping relay releases, the prime counting relay operates in the locking circuit of the last operated counting relay. Hence at the first closure of the interrupter contacts, relays 271 and 2203 and the No. 0' counting relay are operated.

The operation of relay 2203 opens the fundamental circuit as previously traced preventing the reoperation of stepping relay 2202 and causing the release of relay 200. The operation of the No. 0' counting relay closes a circuit from battery through the winding of sequence switch 2200, right contact of cam 2210, left back contact of relay 2208, contact of the No. 0' counting relay, contact of cam 2213 to ground, advancing sequence switch 2200 to position 3.

Relay 200, of course, is held operated as long as interrupter 208 maintains its contact closed. When the interrupter 208 opens its contact, relay 200 releases, opening the circuit of relay 1609. The release of relay 200 also opens the shunt around relay 219 and that relay operates. Since relay 1609 is slow to release, the counting relay circuit above traced is maintained for a time and relay 272 operates and locks. When relay 1609 closes its back contact a circuit is completed (provided the sender has operated correctly) from battery through the winding of relay 1614, back contact of relay 1609, upper right contact of cam 1615, conductor 1616, left contact of cam 103, conductor 181, back contact of relay 274, front contact of relay 272, to grounded conductor 214. Relay 1614 operates and closes a circuit from battery through the winding of sequence switch 1600, front contact of relay 1614 to ground, advancing sequence switch 1600 to position 2. Sequence switch 1600 in passing from position 1 to position 2 opens the battery and ground connections to the relays of Fig. 2 permitting the stepping relay and the counting relays of that figure to release. Relay 1614 also releases as soon as switch 1600 leaves position 1.

If the sender did not operate correctly the above traced circuit for relay 1614 would not have been completed and an alarm would have been sounded after an interval under the control of timing switch 1950 to call the attention of the attendant. The lighted condition of lamps 160 and 1651 in the circuit, which may be traced from ground through lamp 160, right contact of cam 104, conductor 150, lamp 1651, upper contacts of cam 1214, lower left contact of cam 1617 to battery, will indicate that the sender failed during district brush selection at which time it should have selected the No. 0 brush.

The operation of timing switch 1950 is as follows: The arrival of switch 1700 in position 2 closes a circuit from battery through the winding of relay 1958, brush 1951 and its normal terminal, lower right contact of cam 1714 to ground. Relay 1958 operates in this circuit and locks over its inner left contact, contact of key 1960, contact of cam 1544, outer right closed contact of start key 1701 to ground. The operation of relay 1958 closes a circuit from battery through the winding of stepping magnet 1955, brush 1952 and its strapped terminals, outer left contact of relay 1958, contact of interrupter 1959, to ground. Switch 1950 is advanced from position to position under the control of interrupter 1959 until it reaches its No. 7 terminals. When sequence switch 1500 passes from position 18 to position 1 at the completion of a test call the locking circuit of relay 1958 is opened and that relay releases, closing a circuit for stepping magnet 1955 over its back contact, brush 1954 and its strapped off-normal terminals, back contact of relay 1958 to ground, stepping the switch back to one of its normal positions. If any test call takes more time than is required to step switch 1950 from its normal to its No. 7 terminals or from its No. 9 terminals (second normal) to its No. 16 terminals, a circuit will be closed from ground at the right front contact of relay 1958, brush 1953, and its No. 7 terminal or No. 16 terminal, lamp 1957 through the office alarm circuit to battery. Lamp 1957 will be lighted and the office alarm sounded to call attention to the fact that a sender has failed to operate correctly under test. Key 1960 is provided to open the locking circuit of relay 1958 and restore the timing switch, thus cutting off the alarm, when the attendant responds to the signal.

Assuming that district brush selection checked correctly and switch 1600 was advanced to position 2 as previously described, a circuit is closed from battery, through the windings of relays 1618 and 1619 in parallel, upper contact of cam 1605, lower contact of cam 1503, winding of relay 1504, conductor 1505 and thence as previously traced through the middle and right winding of relay 2003 to ground. The current in this circuit is insufficient to operate relay 1618 but causes the operation of relay 1619, which in turn causes the operation of relay 1620. Relay 1620 closes a circuit from battery through the winding of sequence switch magnet 1200, lower right contact of cam 1215, upper right and lower left contacts of cam 1621, front contact of relay 1620, back contact of relay 1618, back contact of relay 1614 to ground, advancing sequence switch 1200 to position 3.

When sequence switch 1200 leaves position 2 the locking circuit of relay 202 is opened and that relay releases permitting the reestablishment of the fundamental circuit. The winding of stepping relay 219 is also reestablished extending in this case from battery over the upper left contact of cam 1612 and the right contact of cam 1212 to conductor 217, through the winding of relay 216, resistance 218, winding of stepping relay 219, conductor 214, right contact of cam 1207, upper left contact of cam 1602 to ground. The operation of relay 200 in the fundamental circuit causes the operation of relays 1609, 202, 211, 210 and 209 in connection with interrupter 208 as previously described.

In the sender relay 2202 operates as before closing in this case a counting relay circuit extending from battery, right contact of cam 2019, winding of the No. 8 counting relay, back contact of the No. 8' counting relay, conductor 2241, translator brush 2354, lower left and upper right contact of cam 2207, inner left normal contact of relay 2208, left contact of cam 2020, front contact of relay 2202, lower left contact of cam 2018 to ground. As previously described the contacts of interrupter 208 are simultaneously connected to the fundamental circuit and to the circuit of stepping relay 219. Each closure of the interrupter contacts shunts the stepping relays and permits the operation of a prime counting relay in the locking circuit of the last operated counting relay. Since the original counting relay circuit closed by stepping relay 2202 extends to the No. 8 counting relay it will require nine pulses from the test circuit to bring about the operation of the No. 0' counting relay and relay 2203. The operation of these relays will open the fundamental circuit as previously traced and advance the sequence switch 2200 to position 4. The circuit for advancing switch 2200 to position 4 extends from ground at the left back contact of relay 2211 instead of at cam 2213.

The nine pulses required to satisfy the sender will result in the operation of relays 270 to 287 inclusive, and the extra pulse provided by the slow releasing relay 1609 will cause the operation of relays 288 and 289 as well. The release of relay 1609 in the manner previously described will close a circuit from battery through the winding of relay 1614, back contact of relay 1609, lower right contact of cam 1615, conductor 1622, upper left contact of cam 124, conductor 189, back contact of relay 290, front contacts of relays 288, 286, 284, 282, 280, 278, 276, 274 and 272 to grounded conductor 214.

*Skipping office selections.*—As before the operation of relay 1614 advances sequence switch 1600 out of position 2. As soon as sequence switch 1600 reaches position 2½ the circuit of relay 1614 is extended from the back contact of relay 1609, over the lower right contact of cam 1623, conductor 1624, to ground at the left contact of cam 144. Therefore, sequence switch 1600 will be advanced to position 5, in which position it will come to rest upon the release of relay 1614. Switch 1600 is immediately advanced out of position 5 in a circuit from battery through its winding, upper right contact of cam 1625, conductor 1626, lower right contact of cam 715 to ground. When switch 1600 reaches position 6, a circuit is closed from battery through the winding of sequence switch magnet 1200, upper left contact of cam 1217, lower contacts of cam 1606, conductor 1627, left contacts of cam 716, interrupter 717, right contact of cam 718 to ground. It is then advanced out of position 6 in a circuit from battery through its winding, lower left contact of cam 1217, lower contact of interrupter 717, right contact of cam 718 to ground and is continued to position 9 under the control of its master cam.

During the advance of sequence switches 1600 and 1200 the reestablishment of the fundamental circuit is prevented by the continued operation of relay 202 in a locking circuit extending through its right winding and inner right contact, right contact of relay 204, left contact of key 203, conductor 207, left contact of cam 1205, conductor 1216, right contact of cam 144 to ground. When switch 1200 leaves position 5 this locking circuit is opened and relay 202 permitted to release.

Since the call simulated is one to an office reached without the use of an office selector rely 2211 is operated as soon as switch 2200 reaches position 2 in a circuit from battery through the winding of relay 2211, lower left and upper right contacts of cam 2214, translator brush 2342, outer left front contact of relay 2121, upper left contact of cam 2018 to ground. The operation of relay 2211 closes a circuit from battery through the winding of sequence switch magnet 2000, upper left contact of cam 2021, left front contact of relay 2211 to ground. Sequence switch 2000 is advanced in this circuit to position 7. When sequence switch 2000 leaves position 6 relay 2211 is deenergized.

*Check of sender response to delayed dialing.*—It will be noted that the circuit for advancing switch 2200 out of position 3 will not be completed until relay 2211 releases after switch 2000 has left position 6. With sequence switch 2000 in position 7 and switch 2200 in position 4, a circuit is completed for relay 2211 from battery through the winding of relay 2211, contacts of cam 2027, outer right back contact of relay 2015, left contact of cam 2227, lower contact of cam 2471, No. 2 and 3 terminals of register control switch brush 2304, outer left front contact of relay 2109 to grounded conductor 2118. Sequence switch 2200 is advanced out of position 4 in a circuit over the upper left contact of cam 2215, lower left contact of cam 2022, to ground. The circuit for relay 2211 is maintained in position 5 of sequence switch 2200.

As long as relay 2211 is operated the circuit for advancing sequence switch 2200 out of position 5 cannot be established.

The advance of sequence switch 1200 under the control of interrupter 717 allows an interval to elapse to test whether relay 2211 prevented the advance of the selecting operations prior to the dialing of the proper digit. With sequence switch 1200 in position 9 a circuit is closed from battery through the winding of relay 1528, upper contacts of cam 1527, upper contact of cam 1218, winding of relay 1219 to ground. Relay 1516 having been operated and locked in the manner previously described, a circuit is completed, due to the operation of relay 1528, from ground over the outer front contact of relay 1528, left front contact of relay 1516, conductor 1521, next to the outer back contact of relay 707, conductor 713, upper contact of cam 556, winding of magnet 550 to battery. Sequence switch 550 makes a revolution transmitting the pulses corresponding to the thousands digit to set the thousands register 2500 in position 9. When switch 550 leaves position 2, the locking circuit of relay 1516 is opened so that relay releases permitting the advance of switch 1500 to position 8. The circuit traced for relay 1528 is maintained in position 8 of switch 1500 and, since relay 1516 is re-operated in position 7½ and locked as before, a second revolution of sequence switch 550 takes place at this time to transmit the hundreds digit and therefore to set register 2510 in position 6. When relay 1516 releases and advances switch 1500 to position 9 no circuit is closed for relay 1528 and no more digits are transmitted at the present time.

When the dialing interrupter 550 is in its normal position relay 1219 is not operated since it is shunted by direct ground over the contact of cam 502, contact of cam 559 and conductor 560. When the interrupter leaves position 1 this shunt is opened and relay 1219 operates.

Should relay 2211 fail to prevent the advance of sequence switch 2200, so that relay 200 operates, as will be described later, in turn operating relay 202 in the usual manner, a circuit will be closed from battery through the winding of relay 1522, inner right contact of relay 1528, conductor 1529, front contact of relay 1219, conductor 1220, outer right contact of key 224, inner left front contact of relay 202, conductor 225, upper left contact of cam 1213 to ground. Relay 1522 operates in this circuit and locks over its inner right front contact to ground at the upper left contact of cam 1530. It also closes an obvious circuit for lamp 1531. The operation of this relay opens the circuit for advancing sequence switch 1500 and thus prevents the completion of the test and, due to the operation of timing switch 1950, the sounding of an alarm.

Following the registration of the hundreds digit by switch 2510, register control switch 2300 will be in position 4 and the circuit for relay 2211 will be opened causing that relay to release. Due to the inclusion of the test of the synchronizing relay 2211 in the present test call no test will be made of trunk guard relay 2216 at this time. This test will be made in subsequent test routing.

*Check of incoming and final selections.*— The fundamental circuit for testing the outgoing trunk is now established from battery, through the winding of relay 200, back contact of relay 201, back contact of relay 202, right contact of key 203, back contact of relay 204, conductor 205, left contact of relay 1202, lower contact of cam 1203, lower contact of cam 1608, left contacts of cam 1501, conductor 1526, outer left front contact of relay 1808, brush 1906, brush 1925, conductor 2050, outer right back contact of relay 2004, upper right contact of cam 2023, left contact of cam 2454, lower right contact of cam 2219, resistance 2218, lower left contact of cam 2207, winding of relay 2216, left winding of relay 2204, left contact of cam 2025, translator brush 2338, compensating resistance 2359, outer left back contact of relay 2024, inner left front contact of relay 2007, conductor 2053, brushes 1926 and 1916, outer right front contact of relay 1808, left contacts of cam 1509, conductor 1532, resistances 353 and 354, right contact of cam 355, conductor 315, upper contact of cam 1628, to ground.

Relay 2216 operates in this circuit, but the resistance of the circuit is too great to permit the operation of relay 200. Also the direction of the current is such that relay 2204 does not operate. The operation of relay 2216 closes an obvious circuit for relay 2220 which in turn closes an obvious circuit for relay 2221. Relay 2221 locks in a circuit over its inner right contact, upper left contact of cam 2222 to ground. The operation of relay 2221, if relay 2211 is released, closes a circuit from battery, winding of sequence switch magnet 2200, lower right contact of cam 2215, right contact of cam 2455, outer right front contact of relay 2221, left back contact of relay 2211, and advances sequence switch 2200 to position 6. When switch 2200 leaves position 5 the locking circuit of relay 2221 is opened.

In position 6 the fundamental circuit is extended as before to the lower right contact of cam 2219 and from thence over the lower left contact of that cam through the winding of stepping relay 2202, back contact of relay 2203, left winding of relay 2204 and thence as previously traced. The current in this circuit is sufficient to cause the operation of relay 200.

The operation of relay 200 initiates the check of incoming brush selection which takes place in the same manner as does the check of district brush selection, except that the counting relay circuit in the sender extends from battery over the right contact of cam 2019, through the No. 4 counting relay, No. 4′ counting relay, conductor 2225, thousands register brush 2503, upper contacts of cam 2224, outer right back contact of relay 2026, left normal contact of relay 2208, left contact of cam 2020, front contact of relay 2202, lower left contact of cam 2218 to ground. Therefore five pulses will be required to satisfy the sender and relays 280 and 281 will be the last ones operated in the test circuit. Relay 1614 will be operated when relay 1609 releases, in a circuit extending over the back contact of relay 1609, upper right contact of cam 1629, right contact of cam 719, upper contact of cam 453, conductor 185, back contact of relay 282, front contact of relays 280, 278, 276, 274 and 272 to grounded conductor 214. The operation of relay 1614 in this circuit causes the advance of sequence switch 1600 to position 7. Since relays 1619 and 1620 are still operated, a circuit is immediately closed for advancing sequence switch 1200 to position 10. At the completion of incoming brush selection sequence switch 2200 is advanced to position 8.

Incoming group selection is checked in the manner described for incoming brush selection. Since hundreds register 2510 is set in position 7 a circuit is closed from battery through the winding of relay 2508, lower left contact of cam 2456, No. 7 terminal of brush 2513 to ground. The counting relay circuit for incoming group selection therefore extends through the winding of the No. 3 counting relay, back contact of the No. 3′ counting relay, conductor 2206, middle front contact of relay 2508, No. 9 terminal of brush 2504, right contacts of cam 2224 and thence as previously traced through the front contact of relay 2202 to ground at the lower left contact of cam 2018. The checking circuit for relay 1614 extends in this case over the back contact of relay 1609, lower right contact of cam 1629, upper contact of cam 454, left contact of cam 803, conductor 184, back contact of relay 280, front contacts of relays 278, 276, 274 and 272 to ground over conductor 214, assuming that the sender has operated correctly. The operation of relay 1614 advances switch 1600 to position 8 and sequence switch 1200 is advanced to position 11 in turn in the usual manner.

The completion of incoming group selection advances sequence switch 2200 to position 10, in which position final brush selection is checked. Switch 1600 is thereupon advanced to position 9, switch 1200 to position 12 and switch 2200 to position 11. When switch 2200 reaches position 10 a circuit is closed from battery through the winding relay 2211, contacts of cam 2027, outer right back contact of relay 2015, upper right contact of cam 2227, No. 4 terminal and brush 2304, outermost left contact of relay 2109, to grounded conductor 2118. The operation of this relay opens the circuit for advancing switch 2200 out of position 11 and hence prevents any further selections as long as switch 2300 remains in position 4.

As soon as switch 1200 reaches position 12 a circuit is closed from battery through the winding of relay 1528, right contacts of cam 1541, lower right contact of cam 1218, winding of relay 1219 to ground. Relay 1528 operates in this circuit but relay 1219 is shunted as previously described. Relay 1516 operated and locked as switch 1500 passed through position 8½ and a circuit is now closed as before for driving dialing sequence switch 550, through one revolution to send out eight pulses to set register 2520 in position 8 as previously described. Relay 1516 releases when switch 550 leaves position 1 and a circuit is closed for advancing switch 1500 to position 15. As soon as register 2520 is positioned register switch 2300 is advanced to its No. 5 terminals and the circuit of relay 2211 is opened. The release of relay 2211 closes a circuit from battery through the winding of sequence switch magnet 2200, left contacts of cam 2235 to ground at the back contact of relay 2211, advancing switch 2200 to position 12 in which position final tens selection takes place.

The checking of final tens selection causes the advance of switch 1600 to position 10 and of switch 1200 to position 13. Following final tens selection switch 2200 is advanced to position 13 as before. However, as soon as switch 2200 reached position 12 a circuit was closed for relay 2211 over the upper contacts of cam 2027, outer right back contact of relay 2015, lower contact of cam 2227, No. 5 terminal of brush 2304, outermost left contact of relay 2109, to grounded conductor 2118.

With switch 1200 in position 13 relay 1528 is operated in a circuit over the upper contacts of cam 1533, left contact of cam 1218, winding of relay 1219 to ground. As before the operation of relay 1528 causes switch 550 to make a revolution and to send out the units digit to set units register 2530 in position 9.

Following the registration of the units digit switch 2300 is advanced to its No. 6 terminals. The advance of switch 2300 opens the circuit of relay 2211 and permits it to close the previously traced circuit for advancing sequence switch 2200 to position 14.

Since this apparatus is adapted to test coin senders as well as non-coin senders and coin senders are arranged to require the deposit of a coin before permitting final units selections to take place the fundamental circuit for final units selection is not established until switch 1500 reaches position 17. The circuits for advancing switch 1500 to position 17 are as follows: Sequence switch 1500 is advanced out of position 11 in the same circuit which advances it out of position 6 since no stations digits are to be sent in the case of the present call. When switch 1500 reaches position 11 a circuit is closed from battery through the winding of relay 1106, conductor 1113, inner left operated contact of multi-test key 1702, conductor 1720, lower contacts of cam 1527, conductor 1534, upper right contact of cam 1221 to ground. Relay 1106 operates and locks over its inner right contact to ground over the upper left contact of cam 1114. The operation of relay 1106 closes a circuit from battery through the winding of relay 305, conductor 316, to ground at the left front contact of relay 1106. Relay 305 operates and locks over its inner left contact, left contact of cam 317 to ground. The operation of relay 305 closes a circuit from battery through the winding of sequence switch magnet 1500, lower right contact of cam 1510, conductor 1535 to ground at the right front contact of relay 305. This circuit advances switch 1500 to position 14. A circuit is now closed from battery through the winding of sequence switch magnet 1500, lower right contact of cam 1536, to ground at the left back contact of relay 1537, thus passing by the positions employed in making tests of coin senders. Switch 1500 comes to rest in position 17.

When switch 1500 reaches position 17, switch 1600 will be in position 10 and switch 1200 in position 13. A fundamental circuit will then be established through the winding of relay 200 and thence as previously traced to conductor 205, back contact of relay 1202, lower contact of cam 1203, left contact of cam 1538, left contact of cam 1631, left contacts of cam 1501 and thence as previously traced through the sender, back to ground at the upper contact of cam 1628. Final units selections are checked in the manner previously described after which switch 1600 is advanced to position 14. Switch 1200 is then advanced to position 17 over the lower left contact of cam 1215, upper right contact of cam 1626 to ground. The sender sequence switch 2200 is advanced to position 15 in the usual manner at the completion of final units selection. It is then advanced to position 16 in a circuit over the lower right contact of cam 2229, lower contact of cam 2457 to ground.

*Check of response to incoming advance.*—
During a service connection, the incoming selector in advancing connects battery and ground to the sender in the reverse direction. The test circuit in order to simulate this condition closes a fundamental circuit from battery through relay 200, back contact of relay 201, conductor 227, lower contacts of cam 1214, conductor 1222, lower left contact of cam 1628, conductor 315, lower right contact of cam 355, resistances 354 and 353, conductor 1532, left contacts of cam 1509, outer left front contact of relay 1808, brushes 1916 and 1926, conductor 2053, inner left front contact of relay 2007, outer left back contact of relay 2024, compensating resistance 2359, brush 2338, left contact of cam 2025, left winding of relay 2204, back contact of relay 2203, winding of relay 2202, lower contacts of cam 2219, left contact of cam 2454, upper right contact of cam 2023, outer left back contact of relay 2004, conductor 2050, brushes 1925 and 1906, outer left front contact of relay 1808, conductor 1526, left contacts of cam 1501, right contact of cam 1631 to ground. The current in this circuit is in such a direction as to cause the operation of relay 2204, which relay closes a locking circuit for itself over the left contact of cam 2231. It also closes a circuit over the upper right contact of cam 2231 for relay 2208. Relay 2202 is also operated in the fundamental circuit as traced.

The operation of relay 2208 closes a circuit from battery over the right contact of cam 2019, winding of the No. 0 counting relay, conductor 2232, inner left front contact of relay 2208, left contact of cam 2020, contact of relay 2202, lower left contact of cam 2018 to ground. The No. 0 counting relay operates in this circuit and closes the usual locking circuit for itself through the No. 0' counting relay and relay 2203.

Relay 200 also operates in this circuit and closes the circuit from ground at its left front contact, over conductor 1204, upper contact of cam 1211, conductor 1223, lower contact of cam 720, conductor 721, upper right contact of cam 1217, winding of sequence switch magnet 1200 to battery, advancing sequence switch 1200 to position 18. Switch 1200 in advancing out of position 17 opens the fundamental circuit causing the release of relays 200 and 2202 and permitting the operation of the No. 0' counting relay and relay 2203 in the locking circuit of the No. 0 counting relay. The operation of the No. 0' counting relay closes a circuit from battery through the winding of relay 2024, outer left front contact of relay 2208, front contact of the No. 0' counting relay, contact of cam 2213 to ground. Relay 2024 operates and locks over its inner left contact, upper left contact of cam 2028, to ground. Relay 2024 in operating closes a circuit through the winding of relay 2004, inner right front contact of relay 2024, contacts of cam 2233, terminals 18 to 21 of brush 2102, of time measure switch 2100, to ground over conductor 2034, provided the time measure switch 2100 has reached position 18 or beyond. For a detailed description of the operation of switch 2100 reference may be made to the above identified application of O. H. Kopp.

Relay 2024 opens the ring side of the fundamental circuit and closes a circuit for advancing sequence switch 2200 to position 17, which may be traced from battery through the winding of magnet 2200, upper left contact of cam 2215, outer right front contact of relay 2024 to ground. When sequence switch 2200 leaves position 16 the circuits of relays 2204 and 2208 open and these relays release. Relay 2208 closes at its back contact a circuit from battery, through the winding of magnet 2200, upper right contact of cam 2229, outer right back contact of relay 2208, lower left contact of cam 2022 to ground advancing sequence switch 2200 to position 18.

The operation of relay 2204 as previously described opens the shunt around the left winding of relay 2003, thus increasing the resistance included in the circuit of that relay and relay 1619. Relay 2003 remains operated but relay 1619 releases, in turn releasing relay 1620. The release of relay 1620 closes a circuit from battery through the winding of sequence switch magnet 1600, upper left contact of cam 1625, back contact of relay 1620, back contact of relay 1618, back contact of relay 1614 to ground. Sequence switch 1600 advances to position 15 in this circuit. With switch 1600 in position 15 a circuit is closed from battery through the winding of sequence switch magnet 1500, lower left contact of cam 1523, upper contacts of cam 1210, upper left contact of cam 1632 to ground.

With switch 1500 in position 18 ground is connected through resistance 1540, over the upper contact of cam 1503, through the winding of relay 1504, conductor 1505, inner left front contact of relay 1807, conductor 1809, brushes 1902 and 1922 to conductor 2006. With sequence switch 1500 in position 18 the tip and ring conductors are opened except for condenser 1542 and the secondary of tone coil 1543 which serve to apprise any operator who may connect with the sender that it is undergoing test. The connection of ground to conductor 2006 results in the grounding of both sides of relay 2003 so that this relay releases. The release of relay 2003 opens the circuit of relay 2007 which relay releases and closes a circuit for operating relay 2005 from battery through the winding of relay 2005, middle right contact of relay 2009, left back contact of relay 2007 to ground. Relay 2005 operates and shunts battery from the winding of relay 2009 so that relay 2009 releases. Relay 2005 locks through its winding and outer right front contact to grounded conductor 2006.

*Check of talking selection.*—Talking selection is now checked, a circuit being established through relay 200 and thence as previously described to conductor 2050, outer right front contact of relay 2004, lower left contact of cam 2201, winding of relay 2202, back contact of relay 2203, resistance 2240, right contacts of cam 2205, outer right back contact of relay 2007, resistance 2123 to ground. Relays 200 and 2202 operate in this circuit as before. Relay 2202 closes a counting relay circuit from battery over the right contact of cam 2019, winding of the No. 0 counting relay, conductor 2232, translator brush 2340, left contacts of cam 2226, middle left contact of relay 2230, upper contact of cam 2029, upper contacts of cam 2207, inner left normal contact of cam 2208, left contact of cam 2020, contact of relay 2202, lower left contact of cam 2018 to ground.

The operation of relay 200 initiates the same operations as described for other selections. When the fundamental circuit is opened, due to the operation of relay 2203 in the locking circuit of the No. 0 counting relay and relay 200 releases, the check circuit is closed as before from battery through the winding of relay 1614, extending over the back contact of relay 1609, upper left contact of cam 1629, conductor 1635, right contact of cam 722, conductor 723, right contact of cam 383, conductor 384, conductor 182, back contact of relay 276, front contact of relays 274 and 272 (assuming that the sender operated correctly) to ground over conductor 214 as previously described. The operation of relay 1614 advances sequence switch 1600 to position 16. The operation of the No. 0' counting relay closes a circuit from battery through the winding of relay 2015, lower left contact of cam 2210, outer left back contact of relay 2208, front contact of the No. 0' counting relay, contact of cam 2213 to ground.

*Restoration of the sender.*—The operation of this relay initiates the restoration of the sender. Registers 2310 and 2320 successively restore immediately after the completion of the setting of the translator and the setting of class switch 2450 as described in the above identified patent of O. H. Kopp. When switch 2200 reached position 11, at which time switch 2000 will be in position 7, a circuit is closed for restoring the thousands numerical switch and the hundreds numerical switch. When switch 2200 reaches position 15 a circuit is closed for restoring the tens and units registers, also the stations register if it has been moved off normal. When all the registers are restored a circuit is completed, assuming that the pulsing leads have been opened as previously noted and relay 2110 has been released, from battery, through resistance 2116, and the left winding of relay 2111 in parallel, winding and back contact of magnet 2307, strapped terminals and brush 2306 of register control switch 2300, right back contact of relay 2110, upper contact of cam 2016 to ground. The register control switch 2300 is stepped to position 10 in this circuit. When it reaches position 10 a circuit is closed from battery, winding and back contact of magnet 2307, brush 2301 and its No. 10 terminals, the normal terminals of brushes 2542, 2532 and 2522, right contacts of cam 2235, normal terminals of brushes 2512 and 2502, lower contacts of cam 2031, normal terminals of brushes 2321 and 2311, inner right front contact of relay 2004, to ground. Register control switch 2300 is moved to its No. 11 terminals in this circuit. The terminals of the second half of switch 2300 are wired in multiple of the corresponding terminals of the first half.

The operation of relay 2015 at the completion of talking selection connects battery through resistance 2001, inner left front contact of relay 2015, over the middle right front contact of relay 2005, in parallel with battery through the winding of relay 2005 to conductor 2006.

In the meantime, switch 1600 being in position 16, a circuit is closed from battery through the winding of sequence switch magnet 1200, upper left contact of cam 1215, lower left and upper right contacts of cam 1539, lower right contact of cam 1632 to ground, advancing sequence switch 1200 to position 1.

When battery, through resistance 2001 and relay 2205, is connected to conductor 2006, which is extended over brushes 1922 and 1902, inner left front contact of relay 1807, through the winding of relay 1504, upper contact of cam 1503, resistance 1540 to ground, relay 1504 is operated and closes a circuit from battery through the winding of relay 1614, back contact of relay 1609, upper left contact of cam 1636, contact of relay 1504, upper right contact of cam 1213 to ground. Relay 1614 operates and advances sequence switch 1600 to position 17.

*Setting of test registers for next call.*—With switch 1600 in position 17 a circuit is closed from battery through the winding of sequence switch 1100, middle right front contact of relay 1106, conductor 1104, outer left operated contact of key 1702, lower left contact of cam 1632 to ground. When sequence switch 1100 leaves position 3 the locking circuit of relay 1106 is opened and that relay releases bringing switch 1100 to rest in position 4. With relay 1106 released a circuit is closed from battery through the winding of relay 170, conductor 171, lower contact of cam 1105, back contact of relay 1106 to ground over conductor 1104. The operation of relay 170 connects battery to one terminal of the register relays 101, 121, 141, etc. as previously described. Registers 100, 120, 140, 400, 420 and 440 are set under the control of cross-connections to racks 1107 and 1108, from cams on sequence switch 1100 in the manner previously described.

As before, as each register comes to rest, the corresponding relay is operated and a series circuit is closed as before to advance sequence switch 300 to position 4. As sequence switch 300 moves from position 3 to position 4 the locking circuit of relay 305 is opened and switch 300 comes to rest in position 4. The numerical registers are then set under the control of cross-connections to cams of switch 300 after which a series circuit is closed from grounded conductor 1104, through the cams of such registers and thence over the left contact of cam 1607, middle right operated contact of multi-test key 1702, conductor 1802, lower right contact of cam 1523, winding of sequence switch magnet 1500 to battery. Sequence switch 1500 is advanced to position 1 in this circuit. When sequence switch 1500 leaves position 18 the circuit of relay 1504 is opened. It also opens the circuit of relay 2005 and that relay releases. Since relay 2015 is operated as previously described, a circuit is closed from battery, winding of sequence switch 2000, lower left contact of cam 2017, left contacts of cam 2236, inner right front contact of relay 2015 to ground. Sequence switch 2000 is advanced to position 9 in this circuit.

When sequence switch 2000 reaches position 8 a circuit is closed from battery, through the winding of sequence switch magnet 2200, upper left contact of cam 2229, lower left contact of cam 2016 to ground advancing sequence switch 2200 to position 1. With sequence switch 2200 in position 1 and switch 2300 normal the release of relay 2005 closes a circuit from battery, through the winding of sequence switch magnet 2000, lower right contact of cam 2021, left contacts of cam 2036, normal terminal and brush 2306 of register control switch 2300, right back contact of relay 2110, contacts of cam 2033, left back contact of relay 2009, left back contact of relay 2005 to ground. Since sequence switch 2200 performs its cycle of operations twice to one revolution, position 10 is its second normal position and the sender is in condition to control another connection.

When sequence switch 2000 leaves position 9 it opens the circuit of relay 2010 and that relay releases, in turn releasing relay 2011. Relay 2011 being slow to release opens the energizing circuit for relay 2012 after an interval, but relay 2012 is maintained energized through its right winding and right front contact, left back contact of relay 2010, left contact of cam 2054, conductor 2002 brushes 1921 and 1912, conductor 1718, lower contact of cam 1717, back or front contact of relay 1806, winding of relay 1801, windings of relay 1805, outer left contact of key 1715, outer right contact of start key 1701 to ground. It may be noted that relay 1801 is not operated in this circuit.

Sequence switch 1600 in passing from position 16 to position 17 momentarily opens the locking circuit of relay 1807 and thus releases this relay and relay 1808. With relay 1807 released the circuits of relays 1801, 1805 and 2012 is maintained through the back contact of relay 1806. With sequence switch 1600 in position 17 and sequence switch 1700 in position 4 a circuit is now prepared from battery over the lower right contact of cam 1612, winding of relay 1806, contact of interrupter 1813, lower contacts of cam 1722, back contact of relay 1801, conductor 1802, middle right operated contact of relay 1702, left contact of cam 1607, through the cams of the numerical registers to ground. Relay 1806 is operated when interrupter 1813 closes its contact and locks for an interval under the control of interrupter 1815. Interrupters 1815 and 1813 are so arranged as to permit this operation. The operation of relay 1806 and its subsequent release due to the opening of interrupter 1815 opens the circuits of relays 1801, 1805 and 2012 causing the release of relay 2012 and a substitution of resistance 2001 therefor. Relays 1805 and 1801 operate on the reestablishment of the circuit.

The operation of relay 1801 closes a circuit through the left winding of relay 1807 and from thence to ground over the series circuit over cams of the numerical registers, relay 1807 locking through its left winding as before and causing the operation of relay 1808. With relay 1807 operated a circuit is closed from battery through the winding of magnet 1600, lower right contact of cam 1625, outer right front contact of relay 1807 to ground, advancing sequence switch 1600 to position 18. The advance of sequence switch 1600 out of position 17 opens the circuit of relay 1806. Switch 1600 remains in this position until switch 1500 is advanced to position 2 in response to the operation of relay 1507.

*Second test—Incoming overflow.*—The second test is to check the operation of the sender when an incoming selector goes to overflow. The numerical code, district and office registers are set in the same positions they were for the last test. A circuit is closed from battery, through the winding of relay 707, lower contact of key 710, normal contact of key 709, upper contact of cam 1115, to ground. The operation of this relay transfers the control leads and pulsing leads from interrupter 550 to interrupter 500 so that the sender is set at the lowest speed for this test. The registers of the sender are positioned in the manner described for the first test. In this case the setting of the registers takes place in the usual manner, that is, the setting of the registers is not delayed until their use becomes necessary, a circuit being provided for relay 1528 over the lower right contact of cam 1519 to ground at the lower left contact of cam 724 with switch 1500 in positions 4 to 5 and 7 to 10. Since no ten thousands digit or stations digit are used a similar circuit to that used in the previous test is provided over the upper right contact of cam 1536 to the same ground at the lower left contact of cam 724 so that switch 1500 is moved directly through these positions. At the completion of the setting of the registers of the sender, switch 1500 is in position 12 whereupon relay 1106 is operated and locked as previously described in turn causing the operation and locking of relay 305. As before the operation of relay 305 advances switch 1500 out of position 12, the switch being carried to position 14 under the control of its master cam. Since we are considering only non-coin senders and relay 1537 is not operated, switch 1500 will be advanced to position 17 from ground at the back contact of relay 1537 as before described.

District selections are checked and office selections are skipped as in the case of the first test, after which switch 1600 is in position 6 and switch 1200 in position 5. Sender control sequence switch 2000 will be in position 7 and sender sequence switch 2200 in position 5. In these positions of the sequence switches the sender tests outgoing trunks to the distant office, establishing the circuit from conductor 2050, through the winding of relay 2216, to conductor 2053 as described in the previous test call.

*Test of trunk guard relay.*—The test circuit at this time sets up a condition to make a non-operate test of the trunk guard relay 2216, and conductor 2050 is extended through brushes 1925 and 1906, outer left front contact of relay 1808, conductor 1526, left contacts of cam 1501, lower contact of cam 1608, right contact of cam 1203, resistance 1224 to battery. It also extends conductor 2053 through brushes 1926 and 1916, outer right front contact of relay 1808, left contacts of cam 1509, conductor 1532, resistances 353 and 354, right contact of cam 355, conductor 315, upper contact of cam 1628 to ground.

Resistance 1224 is of such magnitude as to impose the most severe non-operate condition on relay 2216. Sequence switch 1200 remains in position 6 for one to two seconds after which a circuit is closed from battery, through the winding of sequence switch magnet, lower left contact of cam 1217, lower contact of interrupter 717, lower contact of cam 718 to ground, advancing sequence switch 1200 to position 9. While sequence switch 1200 passes through positions 7 and 8, conductor 2050 is extended over the upper left contact of cam 1203, winding of relay 1225 to battery.

If relay 2216 is not properly adjusted, it closes an obvious circuit for relay 2220 which in turn closes the circuit for relay 2221. Relay 2221 operates and locks over its inner right contact, upper left contact of cam 2222 to ground. The operation of relay 2221 also closes a circuit from battery through the winding of sequence switch magnet 2200, lower right contact of cam 2215, right contact of cam 2455, outer right contact of cam 2221 to ground at the left back contact of relay 2211. Sequence switch 2200 advances to position 6 in this circuit. In moving from position 5 to position 6, switch 2200 opens the locking circuit of relay 2221 and that relay releases. When switch 2200 reaches position 6 the fundamental circuit is extended as previously traced through the winding of relay 2204 and thence over the back contact of relay 2203, winding of stepping relay 2202, lower contact of cam 2219, left contact of cam 2454, and thence as previously traced to ground in the test circuit. This circuit has a smaller resistance than that through the winding of relay 2216.

If relay 2216 operates falsely as above described and advances the sender to the low resistance position, relay 1225 operates and closes a circuit from battery through the winding of relay 1202 and, in parallel through the lamp 1226, front contact of relay 1225, conductor 1227, lower right and upper left contacts of cam 725, conductor 726, conductor 225, upper left contact of cam 1213 to ground. Relay 1202, operates and locks to ground over conductor 1227. When sufficient time has elapsed time alarm switch 1950 causes the operation of the alarm.

If relay 2216 is properly adjusted so that the sender is not advanced to its low resistance position, relay 1225 is not operated and when switch 1200 arrives in position 9, the fundamental circuit is extended as before over the lower contact of cam 1203, back contact of relay 1202, conductor 205 and thence through the winding of relay 200 to battery. The high resistance sender circuit prevents the operation of relay 200 at this time, but the resistance in this circuit is such as to permit the operation of relay 2216 which advances the sender to position 6 as previously described. When it arrives in position 6 relay 200 is permitted to operate and incoming brush selections are checked in the usual manner.

After the completion of incoming brush and group selections sequence switch 1600 would ordinarily be advanced to position 8 but in the present test a holding circuit is closed for relay 1614 when switch 1600 reaches position 7¾, which may be traced through the winding of that relay, over the back contact of relay 1609, upper contact of cam 1623, conductor 1637, lower left contact of cam 727 to ground. This circuit holds relay 1614 operated to advance switch 1600 to position 14, whereupon relay 1614 releases. Switch 1200 is advanced to position 17 in a circuit over the lower left contact of cam 1215, upper right contact of cam 1626, to ground. Switch 1200 is then advanced to position 18 in a circuit over the upper right contact of cam 1217, conductor 721, upper left contact of cam 720 to ground. As switch 1200 advances through position 17 the circuit traced during the last test to simulate incoming advance is now closed to simulate incoming overflow, since overflow terminals are provided with reversed battery and ground.

The fundamental circuit will be closed in the sender for final brush selection at this time and the reversed battery will cause the operation of relay 2204. Relay 2204 in operating locks and causes the operation of relay 2208 in the manner previously described. Since sequence switch 2200 is standing in position 10 the operation of relay 2204 also closes an obvious circuit for relay 2230. Relay 2230 locks over its inner right contact, upper left contact of cam 2028 to ground. The stepping relay 2202 is also operated in the fundamental circuit and a circuit is therefore closed from battery, right contact of cam 2019 through the No. 0 counting relay, conductor 2232, inner left front contact of relay 2208, left contact of cam 2020, front contact of relay 2202, lower left contact of cam 2018 to ground. The No. 0 counting relay operates and locks in the usual manner. When sequence switch 1200 reaches position 18 the fundamental circuit is opened and relay 2202 releases permitting the operation of the No. 0′ counting relay and relay 2203 in the locking circuit of the No. 0 counting relay. The operation of the No. 0′ counting relay closes a circuit from battery through the winding of relay 2024, outer left front contact of relay 2208, front contact of the No. 0′ counting relay, contact of cam 2213 to ground. Relay 2024 operates and locks as previously described. The operation of this relay closes a circuit from battery through the winding of sequence switch magnet 2200, upper right contact of cam 2215, outer right front contact of relay 2024 to ground, advancing sequence switch 2200 to position 17. When switch 2200 leaves position 16 the locking circuit of relay 2204 and the circuit of relay 2208 is opened and these relays release. When relay 2208 releases, sequence switch 2200 is advanced to talking selection position over the upper right contact of cam 2229, right back contact of relay 2208, lower left contact of cam 2022 to ground. When time measure switch 2100 reaches its No. 18 terminal the previously traced circuit for relay 2004 is closed and that relay operates opening the shunt around the right winding of relay 2003 and increasing the resistance in the circuit of relay 1619, the release of which relay causes the advance of sequence switch 1600 to position 15 as previously described. (A failure of relay 2004 to operate is indicated by the failure of relay 1619 to be released and to advance the sequence switch 1600 to position 15.)

Talking selection is now checked in the manner described for the first test call except that the operated condition of relay 2230 arbitrarily closes the counting relay circuit through the No. 3 counting relay which under service conditions would cause the advance of the district to its last talking position. Assuming that the sender operates correctly, switch 1600 will be advanced by the operation of relay 1614 to position 16. The testing apparatus proceeds to the next test as previously described.

Subsequent tests are as follows:
3. Call to zero operator.
4. Call to two-digit operator—Non-coin.
5. Call to unassigned code.
6. Wipe out-mechanical call.
7. Test of the register control switch.
8. Call to a relay call indicator office employing numbers below 10,000 and with stations digit.
9. Call to a relay call indicator office employing a number above 9,999.
10. Call to a mechanical tandem office.
11. Wipe out-relay call indicator call.

These tests are carried out in substantially the same manner as those which are described in detail and those which are described in patent to W. L. Dodge which has been referred to.

Since the sender illustrated is adapted to wipe out automatically on abandoned calls, a brief statement as to operation of such a test call will be given. In the case of test call No. 6, for example, group switch 1100 will be in position 9, numerical switch 300 in position 9 and class switch 700 in position 8. The setting of the registers and the checking of the district and office selections are the same as described for the first test call, after which switch 1200 will be in position 5, switch 1500 in position 17 and switch 1600 in position 5. From the time that switch 1700 reaches position 11¾ the pulsing leads, including relay 2106, are held closed in a circuit which extends as previously traced to conductor 1810 over the lower right contact of cam 1506, conductor 1511, resistance 1109, conductors 1120 and 730, upper contacts of cam 1670, conductor 1671, right winding of repeating coil 1543, left contacts of cam 1541, conductor 1515, resistance 1111, conductors 1112 and 1508, and thence as previously traced.

When switch 1600 reaches position 5, this holding circuit is opened and relay 2106 releases. The release of relay 2106 in turn releases relays 2110 and 2109. With relay 2106 released and relay 2004 still unoperated, a circuit is closed from battery through the winding of relay 2026, outer left back contact of relay 2004, off normal contacts of timing switch brush 2160, outer left front contact of relay 2101, left back contact of relay 2110, back contact of relay 2106, conductor 2139, inner right back contact of relay 2015 to ground. Relay 2026 operates and locks over its left front contact to ground at the inner right front contact of relay 2007. Relay 2026 also connects the winding of relay 2015 to this locking ground thus causing the operation of relay 2015. Relay 2015 in operating connects ground over its outer left front contact to a point between the middle and right windings of relay 2003, thus reducing the resistance in the circuit of relays 1619 and 1618 sufficiently to permit the operation of marginal relay 1618. The operation of relay 1618 closes a circuit from battery through the winding of sequence switch magnet 1600, upper right contact of cam 1625, back contact of relay 1673, front contact of relay 1618, back contact of relay 1614 to ground, advancing sequence switch 1600 to position 6.

The sender makes trunk test in the usual manner, but when it attempts incoming brush selection, the counting relay circuit controlled by stepping relay 2202 of the sender is opened by the operation of relay 2026, which would result in the incoming selector going to tell-tale position in the case of a service connection. All of counting relays of the test circuit are operated in the usual manner. When relay 201 is operated in parallel with relay 293, the fundamental circuit is opened, releasing stepping relay 2202 of the sender. Switch 1600 is advanced to position 7 by the operation of relay 1614 in a circuit over the back contact of relay 1609, upper right contact of relay 1629, conductor 1675, left contact of cam 719, conductor 750, front contacts of counting relays 292, 290, etc. to grounded conductor 214. Switch 1600 is then immediately advanced to position 14 by the operation of relay 1614 in a circuit over the back contact of relay 1609, left contact of cam 1676, conductor 1677, upper contact of cam 715 to ground. With switch 1600 in position 14, switch 1200 is advanced to position 17. With switch 1200 in position 17, the reversed battery circuit previously traced, simulating in this case the conditions met at the tell-tale terminals by a selector, is closed. The further operation of the test circuit and the sender is the same as described for the second test call.

*Advance to next sender.*—At the completion of this last test call a circuit is closed from battery through the winding of sequence switch magnet 1700, upper left contact of cam 1709, inner right normal contact of repeat key 1721, right back contact of relay 1811, conductor 1812, upper contact of cam 1105, right back contact of relay 1106, conductor 1104, outer left operated contact of multi-test key 1702, lower left contact of cam 1632 to ground.

Sequence switch 1700 advances out of position 13 in this circuit. As previously described relay 2012 will be locked through its right winding to conductor 2002 and windings of relays 1801 and 1805. The current through the right winding of relay 2012 is not sufficient to operate relay 1801 although relay 1805 may have operated and shunted its high resistance left-hand winding.

When sequence switch 1700 reaches position 13¾ the above traced circuit is extended from conductor 1718, through resistance 1716, outer left contact of key 1715, outer right operated contact of key 1701 to ground, to test the ability of relay 2012 to remain operated and hold the sender busy. Sequence switch 1700 passes through position 14 under the control of its master cam. It is then advanced out of position 15 by means of a circuit over the lower right contact of cam 1703, middle back contact of relay 1800, back contact of relay 1801, conductor 1802, lower left contact of cam 1719 to ground. When switch 1700 reaches position 14¾ the circuit over the lower contact of cam 1717 is reestablished. Therefore, if relay 2012 failed to remain operated through resistance 1716, resistance 2001 will have been substituted for the resistance of the right winding of relay 2012, relays 1805 and 1801 will have operated, and the circuit for advancing sequence switch 1700 out of position 15 will be opened. If this circuit is not open and sequence switch 1700 advances out of position 15, a circuit is closed in position 16, from battery over the lower right contact of cam 1612, winding of relay 1806, contact of interrupter 1813, lower contacts of cam 1722, back contact of relay 1801, conductor 1802 to ground at the lower left contact of relay 1719. The operation of relay 1806 transfers the circuits of relays 1801 and 1805 from its back contact to its front contact thus opening the circuit of relay 2012 long enough to permit that relay to release. The release of relay 2012 again connects battery through resistance 2001 to conductor 2002 and causes the operation of relays 1801 and 1805. The operation of relay 1801 advances sequence switch 1700 to position 17 as before. It is then advanced out of position 17 to position 18 over the upper contact of cam 1713, left normal contact of key 1723, outer right back contact of relay 1800 to ground at the lower left contact of cam 1714. With switch 1700 in position 18 the previously traced circuit is closed through the winding of magnet 1927 No. 1 terminal of brush 1911, inner right operated contact of start key 1701, left contact of relay 1814, right contacts of cam 1710, brush 1904, brush 1914 to ground. A circuit is also closed from battery through resistance 1803, winding of relay 1804, upper right contact of cam 1710 and thence to ground at brush 1914. A shunt around the circuit of relay 1804 also extends from battery through resistance 1803, lower contact of cam 1711, brush 1901 and its No. 1 terminal, back contact of magnet 1927 and thence over the operating circuit of magnet 1927 to ground at brush 1914.

Magnet 1927 operates and advances sender selector 1920 to the next sender as previously described. The attraction of the armature of magnet 1927 opens the shunt around relay 1804 and that relay operates closing a circuit for advancing sequence switch 1700 to position 1. With switch 1700 in position 1 a circuit is closed from battery through the winding of sequence switch magnet 1200, upper left contact of cam 1215, upper left contact of cam 1724 to ground, restoring this switch to normal if it is not already there. A circuit is also closed from battery through the winding of relay 1614, back contact of relay 1609, right contact of cam 1636, upper left contact of cam 1714 to ground. The operation of relay 1614 restores switch 1600 to normal.

Switch 1500 is restored to normal by means of a circuit over the upper right contact of cam 1510, upper right contact of cam 1724 to ground. Switch 1100 is restored in a circuit over the upper contact of cam 1103, inner right operated contact of key 1702, upper contacts of cam 1705, right back contact of relay 1310 to ground. Switch 300 is restored to normal in a circuit over the right contact of cam 303, upper right contact of cam 1114, to ground when switch 1100 reaches position 15. With all the sequence switches of the test circuit normal and start key 1701 and multi-test key 1702 operated the apparatus is ready to start a test of the second sender and switch 1700 is advanced to position 2.

*Advance to next sender selector.*—When the last sender attached to switch 1920 has been tested and switch 1920 advanced to its No. 21 terminal, switch 1700 will be advanced to position 2 as previously described. At this time a circuit is closed from battery, through the winding of relay 1800, No. 21 terminal and brush 1921, brush 1912, conductor 1718 and to ground at the start key 1701. Relay 1800 will then lock over its left contact to ground at the right contact of cam 1708 as previously described. The operation of relay 1800 advances sequence switch 1700 out of position 2 and it then advances to position 4 under the control of its master cam. In positions 3 and 4 sender selector 1920 is advanced to normal position, the circuit for magnet 1927 extending in this case over brush 1911, upper contact of cam 1712, inner right front contact of relay 1800 to ground at the right contact of cam 1708. Circuits for relay 1804 and the shunt around that relay are also closed. Relay 1804 causes the advance of sequence switch 1700 to position 6. In position 6 the master switches 1900 and 1910 are advanced to their second terminals in the same manner as they were advanced to their first terminals, after which switch 1700 is advanced.

The next sender selector is tested and moved to its first off normal terminals as described for switch 1920. The test of the remainder of the non-coin senders is performed in the same manner as that already described.

When all non-coin senders have been tested, master switches 1900 and 1910 are advanced to the coin senders. These senders are connected to separate sender selectors. A circuit is provided from ground over the terminals of master switch brush 1913 to the windings of relays 1116, 1117 and 1118. These relays operate to control certain operations necessitated by the coin apparatus in the sender in the manner set forth in detail in the Patent No. 1,553,308 granted to W. L. Dodge et al, Sept. 15, 1925. Since these operations are described and claimed in this patent they will not be described further here. The functions of the keys of Fig. 17 to control special tests and special conditions are the same as described in the Dodge patent above referred to.

What is claimed is:

1. In a testing device for testing register senders, means for setting the registers of a sender, means for progressively testing the correctness of the selection controlling operations of the sender, and means to test the ability of the sender to prevent false selections.

2. In a testing system for testing senders that are equipped with selection control apparatus and a device for arresting the progress of selections until said selection control apparatus has been operated, means to variably operate said selection control apparatus, means to cause said device to function, and means to progressively test said selection control apparatus.

3. In a testing system for testing senders that are equipped with selection control apparatus and a device for arresting the progress of selections until said selection control apparatus has been operated, means to variably operate said selection control apparatus, means to cause said device to function, means progressively operable to successively test separate operations of the selection control apparatus, and means to arrest the movement of said progressively operable testing means for indicating the functioning of said device.

4. In a testing system for testing senders that are equipped with selection control apparatus and a device for arresting the progress of selections until said selection control apparatus has been operated, means to variably operate said selection control apparatus, means to cause said device to function, means progressively operable to successively test separate operations of the selection control apparatus, means to arrest the movement of said progressively operable testing means until said device has functioned, and means to continue the movement of said progressively operable testing means after said device has functioned.

5. In a testing device for testing register senders, means for setting the registers of the sender, a sequence switch for controlling said setting operations, a circuit for normally advancing said sequence switch at the completion of each setting operation, means for preventing the closure of said circuit until the selections controlled by the registers already set have been checked, and means for preventing the further operation of said testing device if the sender attempts to continue selection.

6. In a testing device for testing register senders, routing means for successively simulating the conditions of a plurality of types of call, means for setting the registers of the sender under test for each type of call, means for checking the selection controlling operations of the sender for each type of call, and means for delaying the setting of certain registers during certain of said types of call to test the ability of the sender to prevent false selections when dialing is delayed.

7. In a testing device for testing register senders, a pair of routing switches for successively simulating the conditions of a plurality of types of call, means for setting the registers of the sender under test for each type of call, means for checking the selection controlling operations of the sender for each type of call, means under the control of said routing switches for causing the setting of certain registers to be delayed in the case of certain types of call to test the ability of the sender to prevent false selections when dialing is delayed.

8. In a testing device for testing register senders, a pair of routing switches for successively simulating the conditions of a plurality of types of call, means for setting the registers of the sender under test for each type of call, means for checking the selection controlling operations of the sender for each type of call, means under the control of said routing switches for causing the setting of certain registers to be delayed in the case of certain types of call until certain other operations of the testing device have been performed.

9. In a testing device for testing register senders, a pair of routing switches for successively simulating the conditions of a plurality of types of call, means for setting the registers of the sender under test for each type of call, means for checking the selection controlling operations of the sender for each type of call, means under the control of said routing switches for causing the setting of certain registers to be delayed in the case of certain types of call until the selections controlled by the registers already set have been checked.

10. In a testing device for testing register senders, a pair of routing switches for successively simulating the conditions of a plurality of types of call, means for setting the registers of the sender under test for each type of call, means for checking the selection controlling operations of the sender for each type of call, means under the control of said routing switches for causing the setting of certain registers to be delayed in the case of certain types of call until the selections controlled by the registers already set have been checked, and means for preventing the further operation of said testing device if the sender attempts to continue selection.

In witness whereof, I hereunto subscribe my name this 23 day of June, A. D. 1925.

JOHN B. RETALLACK.